(12) United States Patent
Chang et al.

(10) Patent No.: US 7,345,842 B2
(45) Date of Patent: *Mar. 18, 2008

(54) METHOD AND SYSTEM FOR OPTIMIZED SERVO TRACK WRITING MOTOR CURRENT PROFILE TO REDUCE WRITTEN-IN HIGH-FREQUENCY REPEATABLE RUNOUT TRACK MIS-REGISTRATION

(75) Inventors: Jen-Yuan Chang, San Jose, CA (US); Christopher A. Gimenez, San Jose, CA (US); Robert P. Harshberger, Jr., San Jose, CA (US); Jr-Yi Shen, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 154 days.

This patent is subject to a terminal disclaimer.

(21) Appl. No.: 11/203,486

(22) Filed: Aug. 12, 2005

(65) Prior Publication Data

US 2007/0035870 A1 Feb. 15, 2007

(51) Int. Cl.
  *G11B 5/596* (2006.01)
  *G11B 21/02* (2006.01)
  *G11B 5/55* (2006.01)
(52) U.S. Cl. .................................. 360/77.04; 360/75
(58) Field of Classification Search ............... None
  See application file for complete search history.

(56) References Cited

U.S. PATENT DOCUMENTS

| | | | |
|---|---|---|---|
| 5,465,035 A | 11/1995 | Scaramuzzo et al. | |
| 5,638,267 A | 6/1997 | Singhouse et al. | |
| 5,726,879 A | 3/1998 | Sato | |
| 6,002,232 A | 12/1999 | McConnell et al. | |
| 6,178,060 B1 | 1/2001 | Liu | |
| 6,239,938 B1 | 5/2001 | Boberg et al. | |
| 6,307,702 B1 | 10/2001 | Fukushi et al. | |
| 6,314,473 B1 | 11/2001 | Singer et al. | |
| 6,587,293 B1* | 7/2003 | Ding et al. | 360/51 |
| 6,628,471 B1* | 9/2003 | Min et al. | 360/75 |
| 6,738,205 B1 | 5/2004 | Moran et al. | |
| 6,867,949 B1* | 3/2005 | Guo et al. | 360/265.6 |
| 2003/0112545 A1* | 6/2003 | Hanson et al. | 360/77.04 |

OTHER PUBLICATIONS

"Servo Track Writing Technology" Fujitsu Sci. Tech. J. 37.2,p. 220-226 (Dec. 2001).

(Continued)

*Primary Examiner*—William Korzuch
*Assistant Examiner*—Jason Olson

(57) ABSTRACT

A system for reducing written-in high-frequency repeatable run-out track mis-registration occurring during writing of servo information onto a hard disk implementable in a hard disk drive is described. The system includes an excitation frequency adjuster enabled to adjust excitation frequencies away from mechanical modes to provide desired rotation speed of a servo track writer. The mechanical modes are present in said hard disk drive. The system also includes an excitation level adjuster enabled to adjust excitation level to provide a desired DC gain level associated with a motor controller of the servo track writer. The system further includes an excitation frequency content adjuster enabled to adjust excitation frequency content to provide desired current profile of the motor controller, such that a reduction of written-in high frequency repeatable run-out track mis-registration is realized.

13 Claims, 37 Drawing Sheets

OTHER PUBLICATIONS

"Architecture and performance of the ESPER-2 hard-disk drive servo writer" IBM J. Res. Develop. vol. 37 No. 1 Jan. 1993.

"Autotuning of a servowriter head positioning system with minimum positioning error" J. Appl. Phys. 79 (8), Apr. 15, 1996.

"Fast Servo Bang-Bang Seek Control" IEEE Mag-33, n. 6 Nov. 1997.

* cited by examiner

METHOD AND SYSTEM FOR OPTIMIZED SERVO TRACK WRITING MOTOR CURRENT PROFILE TO REDUCE WRITTEN-IN HIGH-FREQUENCY REPEATABLE RUNOUT TRACK MIS-REGISTRATION

FIELD OF THE INVENTION

The present invention relates to servo track writing. More precisely, the present invention provides a method and system for reducing errors that may occur during writing of servo track data.

BACKGROUND OF THE INVENTION

Hard disk drives are used in almost all computer system operations, and recently even in consumer electronic devices such as digital cameras, video recorders, and audio (MP3) players. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago. The hard drive model includes a plurality of storage disks or hard disks vertically aligned about a central core that can spin at a wide range of standard rotational speeds depending on the computing application in which the hard disk drive is being used. Commonly, the central core is comprised, in part, of a spindle motor for providing rotation of the hard disks at a defined rotational speed. A plurality of magnetic read/write transducer heads, commonly one read/write transducer head per surface of a disk, where a head reads data from and writes data to a surface of a disk, are mounted on actuator arms.

Data is formatted as written magnetic transitions (information bits) on data tracks evenly spaced at known intervals across the disk. An actuator arm is utilized to reach out over the disk to or from a location on the disk where information is stored. The complete assembly at the extreme of the actuator arm, e.g., the suspension and magnetic read/write transducer head, is known as a head gimbal assembly (HGA).

In operation, pluralities of hard disks are rotated at a set speed via a spindle motor assembly having a central drive hub. Additionally, there are channels or tracks evenly spaced at known intervals across the disks. When a request for a read of a specific portion or track is received, the hard disk drive aligns a head, via the actuator arm, over the specific track location and the head reads the information from the disk. In the same manner, when a request for a write of a specific portion or track is received, the hard disk drive aligns a head, via the actuator arm, over the specific track location and the head writes the information to the disk.

To enable the read/write head to be properly oriented above the target track, there is disposed on the hard disk information that provides for correctly directing the read/write head to the specific track location. Each track is divided into a number of data sectors and servo sectors. The data sectors are used to contain user data and the servo sectors contain the information for properly locating the read/write head. Due to advances in electronic and manufacturing technologies, there has been a constant increase in the areal density of a hard disk, and while providing an increase in the amount of data that can be stored upon a hard disk, those advancements have proportionally decreased the physical size of the sectors and the tracks therewithin. As track size decreases, there is an increased possibility of data read and/or data write errors which can be caused by track misreading, track mis-registration, mis-alignment of the read/write head, and/or other errors that can cause a read/write error and/or failure. Accordingly, it is becoming more critical to the proper operation or the read/write head to have the information for directing the read/write head precisely and correctly disposed upon the hard disk.

Particularly, prior to hard disk drive assembly, there is a process of servo track writing (STW) in which a manufacturer of a hard disk drive disposes upon the hard disk the positioning information used to locate the read/write head over a given track of the hard disk.

In servo track writing, there are inherent problems in assuring proper (servo track writing) STW. For example, high-frequency repeatable run out (RRO) track mis-registration (TMR) harmonics are present, which can be a major performance detractor to the programming or servo writing to the hard disk. A primary cause of the high-frequency RRO TMR harmonics is the forcing mechanism driven by motor excitation during STW. Another primary cause of the high-frequency RRO TMR harmonics is the associated mechanical system modes having natural frequencies that approximate the excitation frequencies. This results in the written-in RRO TMR that is induced during the STW manufacturing process.

One solution to reduce the written-in RRO TMR was to utilize a written-in servo feed forward method. In this particular method, prerecorded servo RRO feed forward information is utilized and which is written during the STW process on a dedicated servo disc or on servos angularly spaced. The written feed forward information is then read from a servo sector and then used to compensate head positioning for the next servo sector.

This solution is not without certain shortcomings. One such shortcoming of using the servo feed forward method is the significant amount of time that is required during the hard disk drive STW manufacturing process. Another shortcoming is the requirement of additional space on the hard disk that is utilized to store the RRO feed forward information, which can detrimentally affect the storage capacity of the hard disk. Yet another shortcoming is the requirement of additional product speed servo overhead timing in order to read the RRO feed forward information at each servo sector.

Another solution to reduce the written-in RRO TMR is to pre-write or print the servo information onto the hard disk prior to placing the disk(s) into the disk-spindle assembly. The servo information can include RRO feed forward cancellation values. This pre-writing or printing is similar to techniques utilized in the manufacturing of compact discs, e.g., CDs, or digital versatile discs, e.g., DVDs.

This solution is also not without certain shortcomings. One shortcoming is the additional time that is required to accomplish the disk drive servo track writing manufacturing process, which can inherently reduce yield per fix time. Another shortcoming is the requirement of additional disk space to store the RRO feed forward information, which can have a detrimental affect on disk storage capacity. Yet another shortcoming is the requirement of additional product speed servo overhead timing in order to read the RRO feed forward information at each servo sector. Still another shortcoming is that the thermal condition during manufacturing may differ from that of the user. This could cause improper calibration of the correct information because of disk deformation and/or environmental conditions, e.g., temperature. In this particular situation, the servo may utilize incorrect values to correct the target RRO harmonics.

Yet another solution to reduce the written-in RRO TMR is to redesign the actuator or spindle related components for reducing dynamic interaction between the mechanical components of the hard disk drive and the STW (servo track writer) during the servo track writing process.

However, this solution is also not without shortcomings. One shortcoming is the significant time that is required to accomplish the redesigning of the actuator or spindle related components. This can also negatively impact manufacturing tooling which is directly related to product development costs.

Therefore, a need exists for a method and system for servo track writing (STW) which reduces high amplitude RRO TMR harmonics while utilizing existing hard disk drive mechanical designs and hard disk drive manufacturing line tooling.

SUMMARY OF THE INVENTION

Embodiments of the present invention provide such a system for reducing written-in high-frequency repeatable run-out track mis-registration occurring during writing of servo information onto a hard disk implementable in a hard disk drive is described. The system includes an excitation frequency adjuster enabled to adjust excitation frequencies away from mechanical modes to provide desired rotation speed of a servo track writer. The mechanical modes are present in said hard disk drive. The system also includes an excitation level adjuster enabled to adjust excitation level to provide a desired DC gain level associated with a motor controller of the servo track writer. The system further includes an excitation frequency content adjuster enabled to adjust excitation frequency content to provide desired current profile of the motor controller, such that a reduction of written-in high frequency repeatable run-out track mis-registration is realized.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
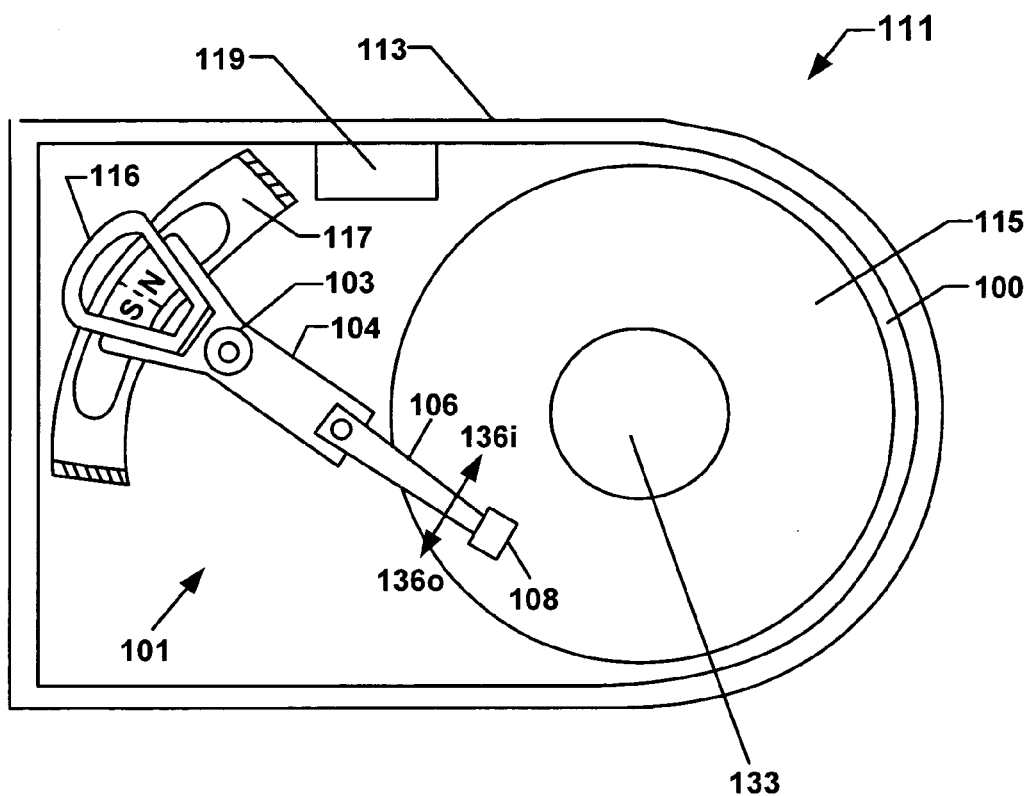
FIG. 1 is a block diagram of a hard disk drive including a hard disk upon which embodiments of the present invention may be practiced.

A method and system for reducing high frequency repeatable run out (RRO) track mis-registration TRM harmonics during servo track writing (STW) of a hard disk implementable in a hard disk drive is described. In the following description, for purposes of explanation, numerous specific details are set forth in order to provide a thorough understanding of the present invention. It is noted that one skilled in the art will comprehend that the present invention may be practiced without these specific details. In other instances, well-known structures and devices are shown in block diagram form in order to avoid obscuring the present invention.

Some portions of the detailed descriptions, which follow, are presented in terms of procedures, steps, logic blocks, processing, and other symbolic representations of operations that can be performed in the operation of a hard disk drive. These descriptions and representations are the means used by those skilled in the data processing arts to most effectively convey the substance of their work to others skilled in the art. A procedure, executed step, logic block, process, etc., is here, and generally, conceived to be a self-consistent sequence of steps, instructions, or fabrications leading to a desired result. The steps are those requiring physical manipulations of physical entities and/or quantities. Usually, though not necessarily always, these entities take the form of structures, components, and/or circuits utilized in the operation of a hard disk drive.

It should be borne in mind, however, that all of these and similar terms are to be associated with the appropriate physical entities and are merely convenient labels applied to these entities. It is noted that throughout the present invention, discussions are presented that refer to actions and/or processes of a servo track writer in conjunction with hard disk drive operation or other such data storage enabling devices.

The present invention is discussed primarily in the context of a high performance hard disk drive, such as those operating near or above 10,000 revolutions per minute. In the present implementation, the high performance hard disk drive described herein and upon which embodiments of the present invention are practiced contains five hard disks and, accordingly, ten read/write heads. Embodiments of the present invention can be readily implemented in conventionally sized high performance hard disk drives, e.g., 3.5 inch, as well as diminutively sized hard disk drives, including those of low profile height. Embodiments of the present invention are well suited to be used with alternative types of hard disk drives including, but which is not limited to, low profile hard drives (e.g., 1.8 inch form factor HDDs), embedded hard disk drives, hard disk drives having a fewer or greater numbers of hard disks and fewer or greater numbers of read/write heads and other data storage devices that have the capability to access a data storage device and upon which data can be stored and/or from which data can be manipulated.

FIG. 1 shows a schematic of a hard disk drive 111 in which embodiments of the present invention can be implemented. Hard disk drive 111 can be a conventionally sized high performance hard disk drive, a low profile high performance hard disk drive such as a 1.8-inch form factor or other high performance hard disk drives. It is particularly noted that embodiments of the present invention are well suited for implementation in most hard disk drives including, but which is not limited to, conventionally sized (e.g., 3.5 inch) hard disk drives, low profile hard disk drives, miniature hard disk drives, and micro drive hard disk drives.

Hard disk drive 111 includes an outer housing or base 113 containing one (shown) or more magnetic disks 115. In an implementation, hard disk drive 111 can be configured with five hard disks 115 and ten read/write heads 108. In another implementation, hard disk drive 111 can be configured with three hard disks 115 and five read/write heads 108. Alternatively, hard disk drive 111 may have greater numbers or fewer numbers of hard disks 115, and as such would have greater or fewer numbers of read/write head 108. A spindle motor assembly 100 having a central drive hub 133 rotates magnetic disks 115. In an embodiment of the present invention, central drive hub 133 can be a fixed shaft/rotating sleeve ball bearing system. In another embodiment of the present invention, central drive hub 133 can be a rotating shaft/fixed sleeve ball bearing system. In yet another embodiment of the present invention, central drive hub 133 can be a fixed shaft/rotating sleeve fluid dynamic bearing (FDB) system. In still another embodiment, central drive hub 133 can be a rotating shaft/fixed sleeve fluid dynamic bearing (FDB) system. Additionally, spindle motor assembly 100 can be comprised of an eight-pole rotor portion and a nine-slot stator portion, in an embodiment of the present invention. It is particularly noted that embodiments of the present invention are well suited for implementation in conjunction with spindle motor assemblies 100 that may be configured with fewer or greater numbers of poles and/or slots.

Continuing with reference to FIG. 1, an actuator 101 includes a plurality of actuator arms 104 (one shown) in the form of a comb that is pivotally mounted above a pivot assembly 103. A controller 119 is also coupled to base 113 for selectively moving the actuator arm 104 relative to disk 115 and for regulating the rotating speed of disks 115.

In the embodiment shown in FIG. 1, actuator arm 104 has extending there from a cantilevered load beam or suspension 106, a magnetic read/write transducer or head 108 mounted on a slider secured to a flexure that is flexibly mounted to each suspension 106. Read/write head 108 magnetically reads data from and magnetically writes data to disk 115. The head gimbal assembly is read/write head and slider 108 mounted on suspension 106. Suspension 106 has a spring like quality for biasing or urging the slider against the disk to enable the creation of air bearing film, or air bearing surface, between the slider and the disk surface. A voice coil 116 housed within a conventional voice coil motor magnet (VCM) assembly 117 (top pole not shown) having a magnet 118 (not shown) is also mounted to actuator arm 104 opposite the head gimbal assembly. Movement of the actuator 101 by controller 119 moves the head gimbal assembly radially across tracks on the disks 115 (inwardly as indicated by arrow 136i and outwardly as indicated by arrow 136o) until heads 108 settle on the target tracks.

Figure 2:
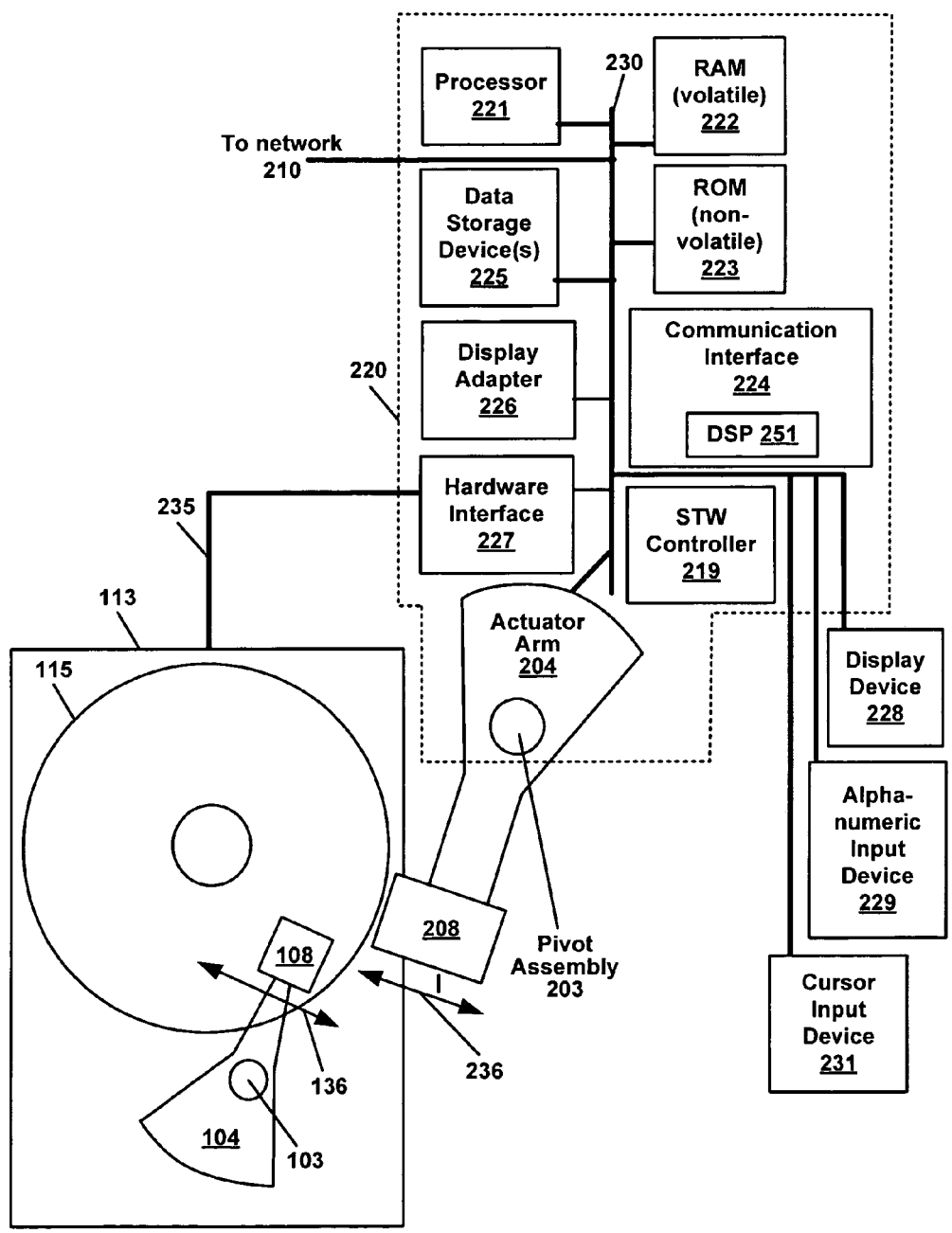
FIG. 2 is a block diagram of a servo track writer and with which can be practiced embodiments of the present invention upon a hard disk in a hard disk drive.

FIG. 2 illustrates circuitry of an exemplary servo writing system 220 for disposing (writing) servo track information onto a hard disk, e.g., hard disk 115 of hard disk drive 111 of FIG. 1. In an embodiment, servo writing system 220 includes an address/data bus 230 for communicating information, at least one central processor 221 coupled with bus 230 for processing information and instructions, a volatile memory 222 (e.g., random access memory, RAM) coupled with the bus 230 for storing information and instructions for the central processor 221 and a non-volatile memory 223 (e.g., read only memory, ROM) coupled with the bus 230 for storing static information and instructions for the processor 221. Servo writing system 220 also includes a data storage device(s) 225 coupled with the bus 230 for storing information and instructions. Data storage device 225 can be, but is not limited to, a magnetic hard drive, a hot swappable magnetic hard drive, an externally coupleable magnetic hard drive (e.g., a hard drive having USB or similar type connectivity), a USB memory drive, an optical storage device, e.g., a CD or DVD, or nearly any other storage device or combination of storage devices that can accessibly retain data and/or information and/or instructions. In an embodiment, servo writing system 220 can have multiple data storage devices coupled therewith. Data storage device 225 can also be removable. Servo writing system 220 also contains a display adapter 226 coupled to bus 230 for causing a display device, e.g., display device 228, to display information to a user of servo writing system 220.

With reference still to FIG. 2, servo writing system 220 also includes a communication interface 224 coupled to bus 230 for providing a communication link between servo writing system 220 and any network environment, e.g., network 210 (not shown). Communication interface 224 can provide wireless and/or landline communication. Communication interface 224 can be, but is not limited to, an ethernet adapter (wired or wireless), a IEEE 1394 adapter, a FireWire adapter, a modem (wired or wireless), a Bluetooth wireless communication circuit, a Satellite communication circuit, an RF or infra-red wireless communication circuit or nearly any other wired or wireless communication circuit. In a wireless embodiment, communication circuit 224 can be coupled to an antenna (not shown) and provides the functionality to transmit and receive information over a wireless communication interface. As such, communication interface 224 enables central processor unit 221 to communicate, wirelessly or via a wire line, with other electronic systems coupled to a network, e.g., network 210. Network 210, to which servo writer system 220 is communicatively coupleable, can be, but is not limited to, a PAN (personal area network, a LAN (local area network), a WAN (wide area network), or alternative network type that enables servo writing system 220 to access or to be accessed from a company's Intranet or the Internet. It is noted that a nearly endless variety of configurations, in nearly any combination, can be implemented within network 210 which can include, but which is not limited to, a peer-to-peer network, a client/server network, a token ring network, and the like.

In an alternative embodiment, servo writing system 220 can include within communication circuit 224, an optional digital signal processor (DSP) 251 for processing data to be transmitted or data that are received via communication circuit 224. Alternatively, processor 221 can perform some or all of the functions performed by DSP 251.

Servo writing system 220 further includes an optional cursor control or directing device, e.g., cursor input device 231, coupled to bus 230 for communicating user input information and command selections to processor 221. In one implementation, cursor input device 231 can be, but is not limited to, a mouse, a roller-ball, a scroll bar, a joy stick or other cursor input device. In another embodiment, cursor input device 231 can be used as an on-screen cursor control device in conjunction with a touch screen device incorporated with display device 228. Cursor input device 231, when configured as an on-screen cursor control device, is capable of registering a position on display device 228 where a stylus, or other appropriate makes contact. The display device 228 utilized with servo writing system 220 may be a liquid crystal display device, a cathode ray tube (CRT), a thin cathode ray tube (TCRT), a plasma display, a field emission display device (also called a flat panel CRT), a light emitting diode (LED) display or any other display device suitable for generating graphic images and alphanumeric characters recognizable to the user.

Servo writing system 220 further includes an alphanumeric input device 229 that, in one implementation, is a keyboard. Alphanumeric input device 229 can communicate information and command selections to processor 221. Alphanumeric input device 229 is coupled to bus 230 and includes alphanumeric and function keys.

Servo writing system 220 also includes an actuator arn(s) 204 (one shown) that may be in the form of a comb that is pivotally mounted above a pivot assembly 203. Actuator arm 204 has extending there from a read/write head 208. Read/write head 208 is for writing servo track information onto a hard disk 115. Additionally included in servo writing system 220 is an STW controller 219, coupled to bus 230, for selectively moving the read/write head 208 (mounted to actuator arm 204) relative to hard disk 115 in a direction as indicated by arrow 236.

Servo writing system 220 also includes a hardware interface card 227 coupled to bus 230. Hardware interface card 227 is for electronically and communicatively coupling a hard disk drive 111 to a servo writing system 220, via an input/output line 235, in an embodiment of the present invention. In an alternative embodiment, hard disk drive 111 may be coupled to hardware interface 227 via bus 230. Hardware interface card 227 can, when a hard disk drive 111 is coupled thereto, assert control over the functions and operations of hard disk drive 111. It is particularly noted that hardware interface 227 can control a spindle motor operable in a hard disk drive 111, therefore enabled to adjust the rotating speed of a hard disk 115 during a servo track writing process, in an embodiment of the present invention. In another embodiment, a controller 219 may be implemented to assert control over the spindle motor in a hard disk drive 111. In yet another embodiment, alternative components within servo writing system 220 may be implemented to control hard disk drive 111, provided the alternative components are enabled with functionalities similar to hardware interface 227 and/or STW controller 219.

Figure 3:
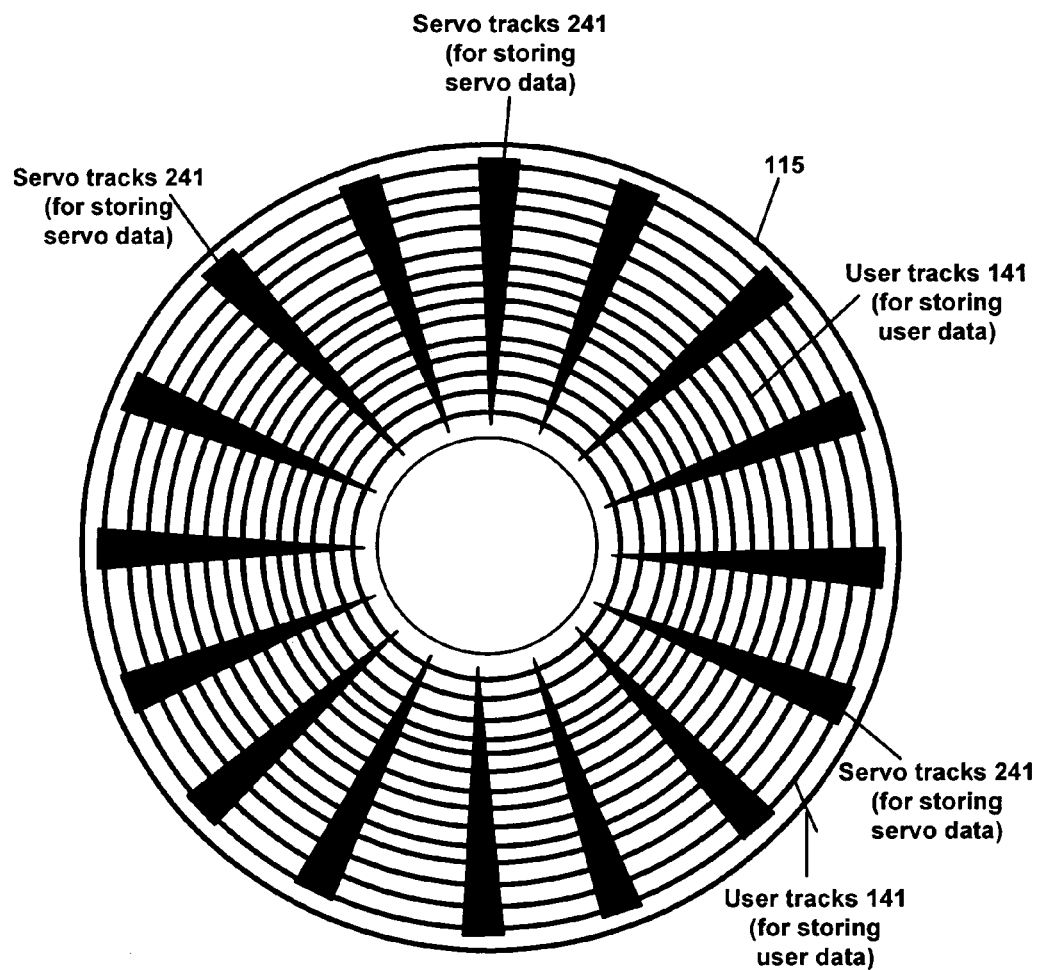
FIG. 3 is a block diagram of a hard disk illustrating an exemplary servo track writing pattern disposed upon a hard disk during servo track writing as performed by the servo track writer of FIG. 2 in an embodiment of the present invention.

Still referring to FIG. 2, shown electronically and communicatively coupled to servo writing system 220, via input/output line 235, is a hard disk drive 111 having at least one hard disk 115 and upon which embodiments of the present invention may be practiced. In an embodiment of the present invention, hard disk drive 111 may be coupled to servo track writer 220 via a tail connection extending from actuator arm 104. In alternative embodiments, other coupling mechanisms may be utilized to communicatively couple hard disk drive 111 to servo track writing system 220. When coupled to servo track writing system 220, hard disk 115 of hard disk drive 111 can receive the servo track information, e.g., track and sector location, necessary for proper disk drive operation, as shown in FIG. 3. In the present embodiment, hardware interface card 227 and/or STW controller 219 is enabled to assert control of the operation of hard disk drive 111 during a servo track writing process, e.g., servo track writing process 400 of FIG. 4.

In an embodiment of the present invention, hard disk drive 111 can include an actuator arm 104 having a read/write head 108 attached therewith and which hardware interface card 227 and/or STW controller 219 is enabled to selectively move actuator arm 104 relative to disk 115, in a direction as indicated by arrow 136. In an alternative embodiment, actuator arm 104 may not be present during the servo track writing process.

FIG. 3 is an exemplary diagram of a hard disk 115 having received the servo pattern and related track information as performed by a servo track writer, e.g., servo writing system 220 of FIG. 2, in an embodiment of the present invention. Hard disk 115 is shown to include, in part, a plurality of regions for servo track data, e.g., servo tracks 241, onto which is written the necessary servo track information and a plurality of regions for user data, e.g., user tracks 141, onto which user data will be written and from which user data can be retrieved, subsequent to completion of the hard disk drive 111 assembly into which a hard disk 115 is implemented. In the shown embodiment, hard disk 115 contains sixteen servo pattern tracks 241 and user data regions 141. Alternatively, hard disk 115 may be comprised of fewer or greater numbers of servo track regions 241 and user data regions 141 in which servo track regions may utilize a lesser or greater amount of available data space.

Figure 4:
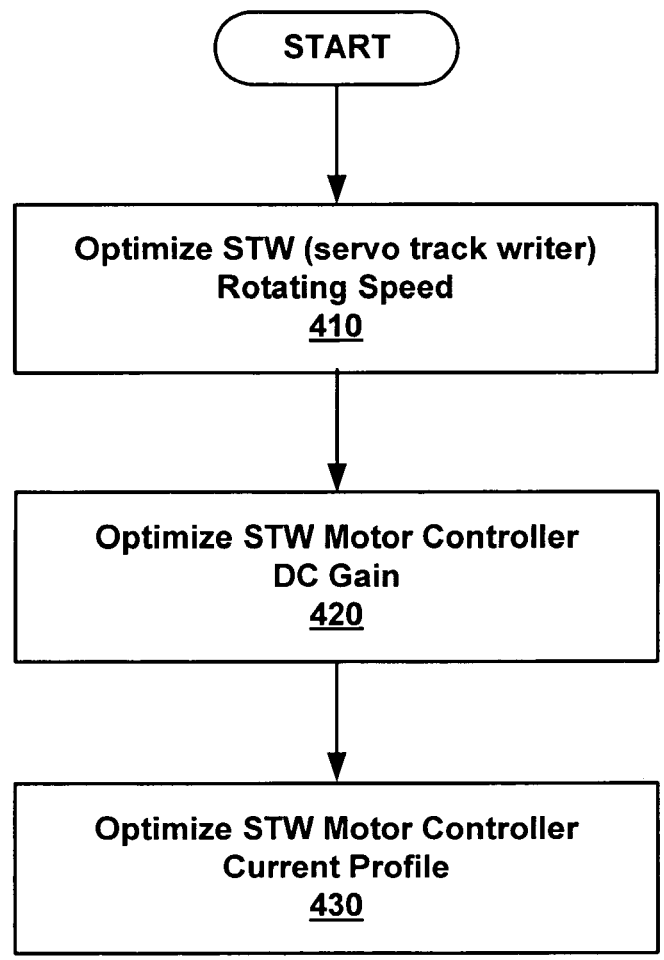
FIG. 4 is a flowchart of a process for reducing RRO (repeatable run out) TMR (track miss-registration) during STW (servo track writing) in an embodiment of the present invention.

FIG. 4 is a flowchart of a process 400 in which particular steps are performed in accordance with an embodiment of the present invention for optimizing servo track writing motor current to reduce written-in high-frequency repeatable run-out track mis-registration. FIG. 4 includes processes of the present invention which, in one embodiment, are carried out by processors and electrical components under the control of computer readable and computer executable instructions. The computer readable and computer executable instructions reside, for example, in data storage features such as computer usable volatile memory 222 and/or computer usable non-volatile memory 223 and/or data storage device 225 in servo writing system 220 of FIG. 2. However, the computer readable and computer executable instructions may reside in any type of computer readable medium. Further, the computer readable and computer executable instructions may also reside in a computer system that is communicatively coupleable to servo writing system 220, e.g., via a network 210. Although specific steps are disclosed in process 400, such steps are exemplary. That is, the present invention is well suited to performing various other steps or variations of the steps recited in FIG. 4. Within the present embodiment, it should be appreciated that the steps of process 400 may be performed by software, by hardware or by any combination of software and hardware. It is noted that process 400 is described in conjunction with FIGS. 5A-5F, 6A-6C, 7, 8A-8B, 9, 10A-10B, 11A-11F, 12A-12F and 13A-13F in order to more fully describe the operation of the present embodiment and the subsequent results.

It is particularly noted that in an embodiment of the present invention, Equation 1, shown below, is implemented in conjunction with the steps of process 400, e.g., part 1 and step 410, part 2 and step 420 and part 3 and step 430. In the present embodiment, process 400 and Equation 1 are implemented in conjunction with a high performance hard disk drive, e.g., an enterprise or similar type hard disk drive having operating speeds in excess of 10,000 rpm. Alternatively, process 400 and Equation 1 are well suited to be adapted for utilization with nearly any hard disk drive having nearly any operating speed.

Equation 1:

$$\underbrace{u_s(r, \theta, t)}_{\substack{\text{Part 1} \\ \text{Step 410}}} \sim \sum_{allmodes, i} \{\underbrace{[F/(\omega_e^2 - \omega_i^2)]}_{\substack{\text{Part 2} \\ \text{Step 420}}} \times \underbrace{\sin(w_e t) \times U_i(r, \theta)}_{\substack{\text{Part 3} \\ \text{Step 430}}}\}$$

Where: $u_s$ is the response of the structure
r is a radial related to the hard disk
θ is the circumferential location of a track on the disk
t is the time variable
$\Sigma_{allmodes,i}$ is the summation of all structure mechanical vibration modes contributing to the structure response $u_s$
F is the excitation amplitude
$\omega_e$ is the excitation frequency
$\omega_i$ is the natural frequency of the mechanical mode
$U_i$ is the mechanical vibration mode shape of the structure In an embodiment of the present invention, Equation 1 can be disposed entirely or combinationally in a memory unit of servo writing system 220, e.g., in non-volatile memory, e.g., ROM 223, in random access memory, e.g., RAM 222, or in a magnetic or optical storage device, e.g., data storage device 225, of FIG. 2. Alternatively, Equation 1 can be disposed within a network, e.g., network 210 of FIG. 2 and through which servo writing system 220 can access Equation 1 stored therewithin.

In step 410 of process 400 and in conjunction with part 1 of Equation 1, the rotational speed of a hard disk, upon which servo track information is to be disposed, e.g., hard disk 115 in hard disk drive 111 (FIGS. 1, 2 and 3) and controlled by hardware interface 227 in conjunction with STW controller 219 of servo writing system 220 of FIG. 2, is adjusted to reduce RRO (repeatable run-out) and other TMR (track mis-registration) related modes, in an embodiment of the present invention.

Specific parameters for the servo writing system 220 rotating speed (as applied to a hard disk 115) are implemented so that overall RRO/NRRO (repeatable run-out/non-repeatable run-out) can reach desired threshold values related to head flying height and STW timing requirements. These parameters can include, but which is not limited to, the rotating speed is slower than desired such that read/write head 208 may crash into hard disk 115, the rotating speed is faster than desired such that the flying height of read/write head 208 may be excessively elevated above hard disk 115 so as to prevent read/write head 208 from properly disposing the necessary servo track information onto hard disk 115. Continuing, an excessively fast rotating speed can cause disk flutter, other perturbations, and/or an elliptical rotation of the spindle motor. Additionally, it is known that there are different frequencies inherent to the spindle motor, which causes rotation of the hard disk, that are dependent upon the location of the data on the hard disk, e.g., inner diameter, middle diameter and outer diameter.

Still referring to step 410, because of the difficulty in determining a writing speed enabling servo track writing that maintains minimal RRO rms (root mean square, also commonly referred to as the effective value) and reduces high frequency RRO, and takes into account a manufacturing variation from file to file, various STW 220 rotating speeds were utilized. These rotating speeds ranged from, but which were not limited to, 5800 to 6700 rpm's, based on allowable speed range requirements, to determine the optimized rotating speed applied to a hard disk 115 by STW 220. Based on values obtained during implementation of the present embodiment, in conjunction with an enterprise type hard disk drive, a servo track writing speed of approximately 5900 rpm was determined to be qualitatively acceptable for the servo track files in relation to terms of dynamics and RRO. It is particularly noted that when embodiments of the present invention are implemented in conjunction with alternative hard disk drive types, the optimized STW 220 rotating speed can be slower than or faster than 5900 rpm, dependent upon the mechanical and performance characteristics of the hard disk drive upon which the present invention is to be practiced.

Figure 5A:
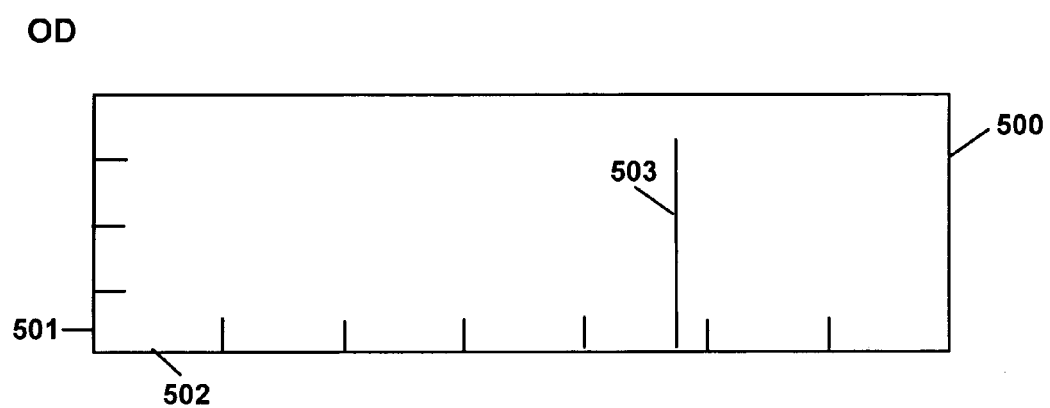
FIG. 5A is a graph showing the mechanical harmonics and frequency magnitude relative to the outer diameter of a hard disk in conjunction with a conventional servo track writer.
Figure 5B:
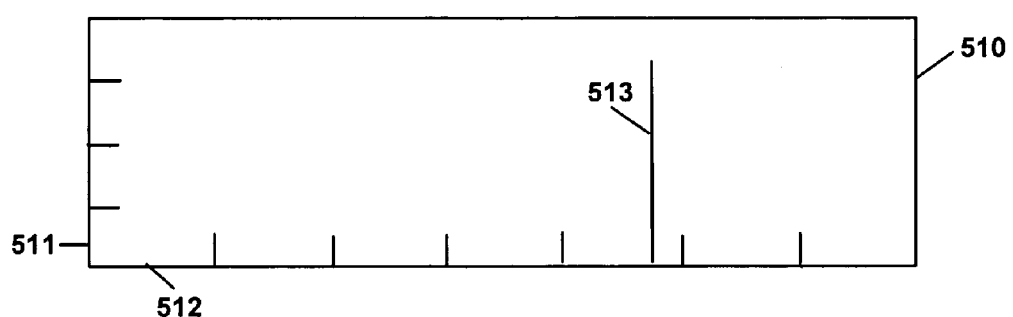
FIG. 5B is a graph showing the mechanical harmonics and frequency magnitude relative to the middle diameter of a hard disk in conjunction with a conventional servo track writer.
Figure 5C:
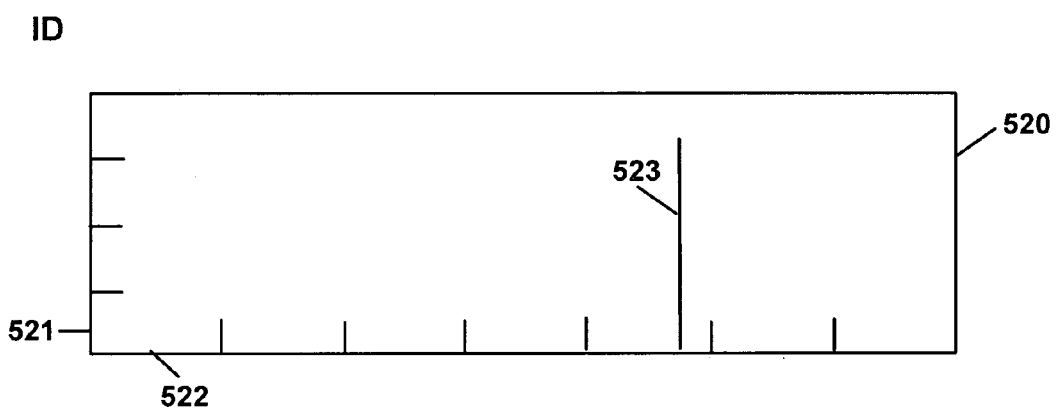
FIG. 5C is a graph showing the mechanical harmonics and frequency magnitude relative to the inner diameter of a hard disk in conjunction with a conventional servo track writer.

FIGS. 5A, 5B and 5C are illustrated graphs depicting the excitation magnitude and harmonic frequency of perturbations present in a hard disk drive subjected to a conventional servo writing process in which the STW rotating speed was approximately 5800 rpm's. FIG. 5A shows a graph 500 depicting the excitation magnitude and harmonic frequency of perturbations present in the outer diameter region of a hard disk 115. Graph 500 includes a vertical axis 501 (in increments of 0.5) representing the magnitude of the excitation and a horizontal axis 502 representing the harmonic frequency (in increments of 20) in which the excitation occurs. Graph 500 also includes a line 503 indicating the excitation amplitude frequency of the harmonic perturbation. Line 503 shows a magnitude of approximately 1.75 and a harmonic frequency of approximately 96.

FIG. 5B shows a graph 510 depicting the excitation magnitude and harmonic frequency of perturbations present in the middle diameter region of a hard disk 115. Graph 510 includes a vertical axis 511 (in increments of 0.5) representing the magnitude of the excitation and a horizontal axis 512 representing the harmonic frequency (in increments of 20) in which the excitation occurs. Graph 510 also includes a line 513 indicating the excitation amplitude frequency of the harmonic perturbation. Line 513 shows a magnitude of approximately 1.3 and a harmonic frequency of approximately 96.

FIG. 5C shows a graph 520 depicting the excitation magnitude and harmonic frequency of perturbations present in the inner diameter region of a hard disk 115. Graph 520 includes a vertical axis 521 (in increments of 0.5) representing the magnitude of the excitation and a horizontal axis 522 representing the harmonic frequency (in increments of 20) in which the excitation occurs. Graph 520 also includes a line 523 indicating the excitation amplitude frequency of the harmonic perturbation. Line 523 shows a magnitude of approximately 1.8 and a harmonic frequency of approximately 96.

Figure 5D:
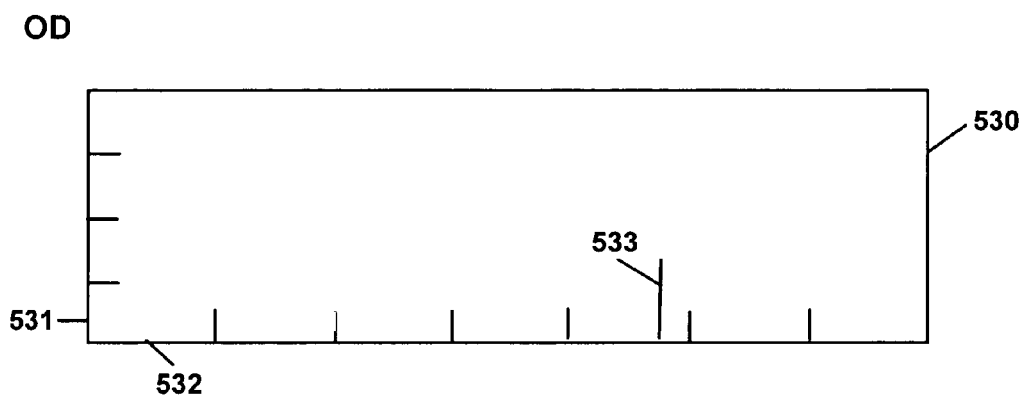
FIG. 5D is a graph showing mechanical harmonics and the frequency magnitude reduction relative to the outer diameter of a hard disk in conjunction with a servo writing system in accordance with an embodiment of the present invention, as compared with the graph of FIG. 5A.
Figure 5E:
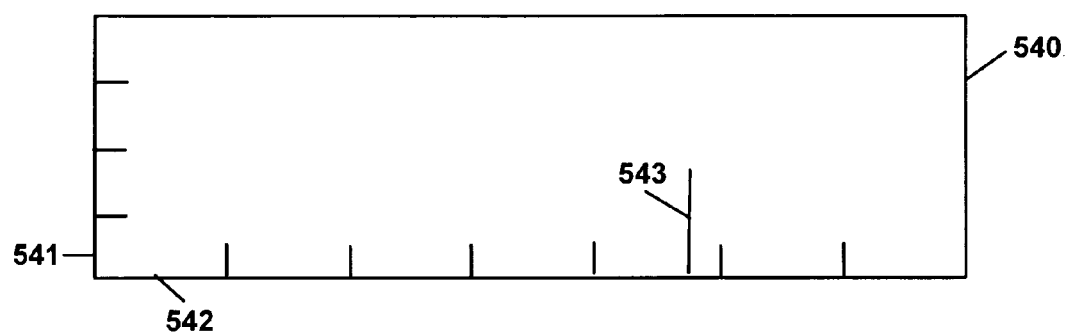
FIG. 5E is a graph showing mechanical harmonics and the frequency magnitude reduction relative to the middle diameter of a hard disk in conjunction with a servo writing system in accordance with an embodiment of the present invention, as compared with the graph of FIG. 5B.
Figure 5F:
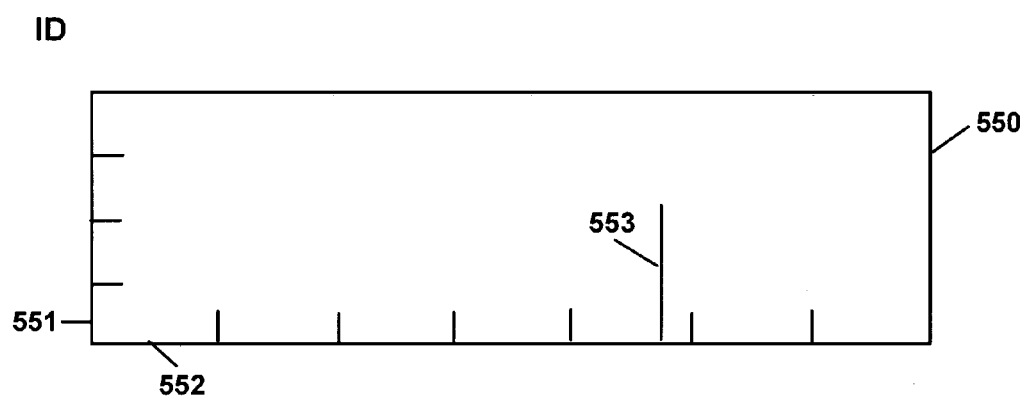
FIG. 5F is a graph showing mechanical harmonics and the frequency magnitude reduction relative to the inner diameter of a hard disk in conjunction with a servo writing system in accordance with an embodiment of the present invention, as compared with the graph of FIG. 5C.

FIGS. 5D, 5E and 5F are illustrated graphs depicting the excitation magnitude and harmonic frequency of perturbations present in a hard disk drive subjected to a servo writing process in which servo writing system 220 servo writes at approximately 5900 rpm's, in accordance with an embodiment of the present invention. FIG. 5D shows a graph 530 depicting the excitation magnitude and harmonic frequency of perturbations present in the outer diameter region of a hard disk 115. Graph 530 includes a vertical axis 531 (in increments of 0.5) representing the magnitude of the excitation and a horizontal axis 532 representing the harmonic frequency (in increments of 20) in which the excitation occurs. Graph 530 also includes a line 533 indicating the excitation amplitude frequency of the harmonic perturbation. Line 533 shows a magnitude of approximately 0.65 and a harmonic frequency of approximately 96. When compared to graph 500, graph 530 of the present invention shows a reduction in excitation magnitude of approximately sixty-six percent.

FIG. 5E shows a graph 540 depicting the excitation magnitude and harmonic frequency of perturbations present in the middle diameter region of a hard disk 115. Graph 540 includes a vertical axis 541 (in increments of 0.5) representing the magnitude of the excitation and a horizontal axis 542 representing the harmonic frequency (in increments of 20) in which the excitation occurs. Graph 540 also includes a line 543 indicating the excitation amplitude frequency of the harmonic perturbation. Line 543 shows a magnitude of approximately 0.8 and a harmonic frequency of approximately 96. When compared to graph 510, graph 540 of the present invention shows a reduction in excitation magnitude of approximately forty percent.

FIG. 5F shows a graph 550 depicting the excitation magnitude and harmonic frequency of perturbations present in the inner diameter region of a hard disk 115. Graph 550 includes a vertical axis 551 (in increments of 0.5) representing the magnitude of the excitation and a horizontal axis 552 representing the harmonic frequency (in increments of 20) in which the excitation occurs. Graph 550 also includes a line 553 indicating the excitation amplitude frequency of the harmonic perturbation. Line 553 shows a magnitude of approximately 1.25 and a harmonic frequency of approximately 96. When compared to graph 520, graph 550 of the present invention shows a reduction in excitation magnitude of approximately thirty percent.

Thus, as can be discerned during comparison between FIGS. 5A-5C and FIGS. 5D-5F, embodiments of the present invention provide a substantial reduction in the magnitude of the perturbations at the harmonic frequency particular to hard disk 115 of hard disk drive 111 in FIGS. 1, 2 and 3 through the optimization of the rotating speed of servo writing system 220 of FIG. 2. It is noted that in the present embodiment, the rotating speed was adjusted to reduce the magnitude of the perturbations. It is also noted that the rotating speed of a servo writing system 220 may be increased or reduced to achieve a reduction in the magnitude of the perturbation depending upon the hard disk drive type upon which embodiments of the present invention are to be practiced.

In step 420 of process 400 and in conjunction with part 2 of Equation 1, the STW motor controller DC gain is optimized to reduce the RRO amplitude. Step 420 optimizes the motor controller DC gain to achieve a reduction in the RRO amplitude. A relationship was established between the excitation level and the resultant high frequency, e.g., 96, RRO given the constraints that side effects on STW timing and track quality are minimized if not eliminated.

Figure 6A:
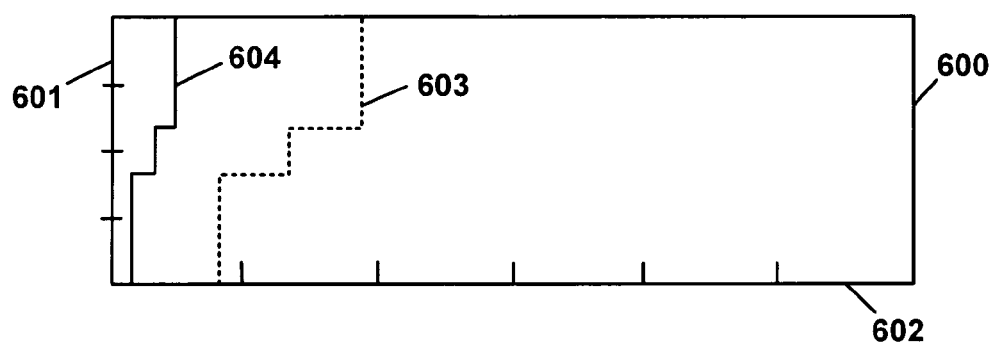
FIG. 6A is a graph showing a reduction in RRO TMR relative to a particular read/write head in a hard disk drive in accordance with an embodiment of the present invention.
Figure 6B:
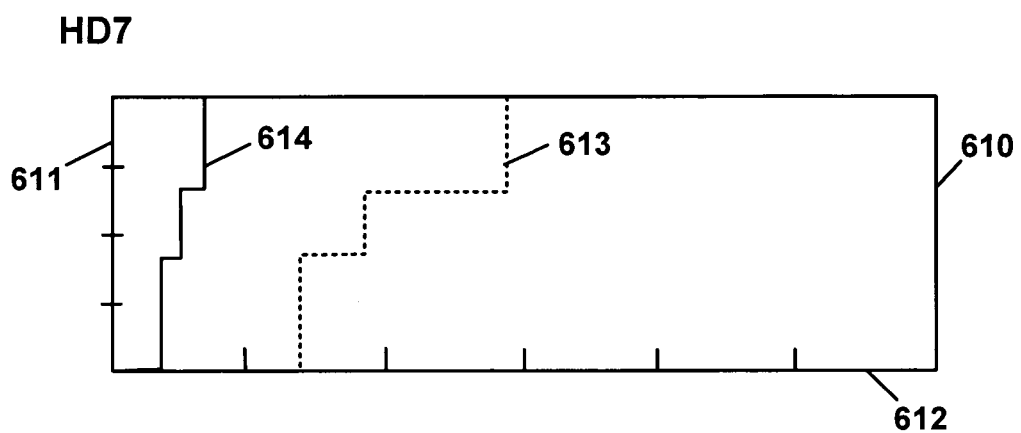
FIG. 6B is a graph showing a reduction in RRO TMR relative to another particular read/write head in a hard disk drive in accordance with the present embodiment.
Figure 6C:
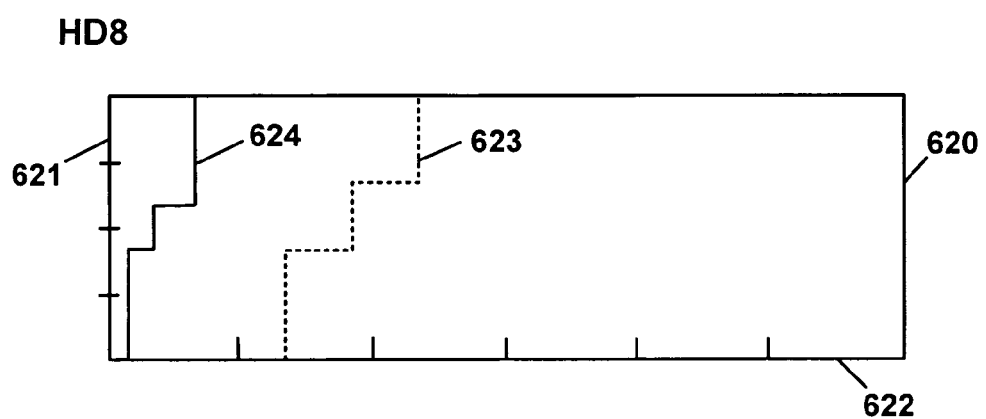
FIG. 6C is a graph showing a reduction in RRO TMR relative to yet another read/write head in a hard disk drive in accordance with the present embodiment.

In the optimization work shown in FIGS. 6A-6C, the repeatability of the effect of the motor controller DC gain of a servo writing system, e.g., 220, on the excitation frequency, e.g., the 96 frequency (shown in FIGS. 5A-5F) was determined. It was found that RRO amplitude was dependent upon the STW motor controller DC gain and was very repeatable when the file was re-servo-written. It was determined that an approximate ten percent reduction in the motor controller DC gain of servo writing system 220 achieved the desired reduction of the RRO amplitude. It was further determined that an approximate fifteen percent reduced gain had certain STW timing issues. It was also determined alternative reduction percentages achieved no significant further reductions. Accordingly, in the present embodiment relative to an enterprise type hard disk drive, e.g., hard disk drive 111, the motor controller DC gain of servo writing system 220 was optimized with a reduction of ten percent when compared to motor controller DC gain levels in conventional servo track writers.

FIGS. 6A, 6B and 6C are illustrated graphs depicting the RRO amplitude of a conventional servo track writer and the RRO amplitude of a servo writing system, e.g., servo writing system 220 of FIG. 2, in accordance with an embodiment of the present invention. FIG. 6A shows a graph 600 depicting the RRO amplitude of head 5 in hard disk drive 111 of FIG. 1. Graph 600 includes a vertical axis 601 (in increments of 0.25) representing the magnitude of the RRO and a horizontal axis 602 representing the amount of RRO (in increments of 2) as a percentage of track pitch rms. Graph 600 also includes a line 603 indicating the motor controller DC gain RRO in a conventional servo track writer and a line 604 indicating the reduction of RRO relative to a motor controller DC gain reduction of approximately ten percent applied to servo writing system 220, in accordance with an embodiment of the present invention.

FIG. 6B shows a graph 610 depicting the RRO amplitude of head 7 in hard disk drive 111 of FIG. 1. Graph 610 includes a vertical axis 611 (in increments of 0.25) representing the magnitude of the RRO and a horizontal axis 612 representing the amount of RRO (in increments of 2) as a percentage of track pitch rms. Graph 610 also includes a line 613 indicating the motor controller DC gain RRO in a conventional servo track writer and a line 614 indicating the reduction of RRO relative to a motor controller DC gain reduction of approximately ten percent applied to servo writing system 220, in the present invention.

FIG. 6C shows a graph 620 depicting the RRO amplitude of head 7 in hard disk drive 111 of FIG. 1. Graph 620 includes a vertical axis 621 (in increments of 0.25) representing the magnitude of the RRO and a horizontal axis 622 representing the amount of RRO (in increments of 2) as a percentage of track pitch rms. Graph 620 also includes a line 623 indicating the motor controller DC gain RRO in a conventional servo track writer and a line 624 indicating the reduction of RRO relative to a motor controller DC gain reduction of approximately 10 percent applied to servo writing system 220, in the present invention.

Thus, FIGS. 6A-6C illustrate an achieved reduction in high frequency written in RRO TMR through optimization of motor controller DC gain in servo writing system 220. It is noted that in an alternative embodiment practiced upon other hard disk drive types, the optimization may include a higher reduction than presented herein. It is further noted that in another embodiment, optimization may include increasing motor controller DC gain, depending upon the hard disk drive type upon which embodiment of the present invention are practiced.

Figure 7:
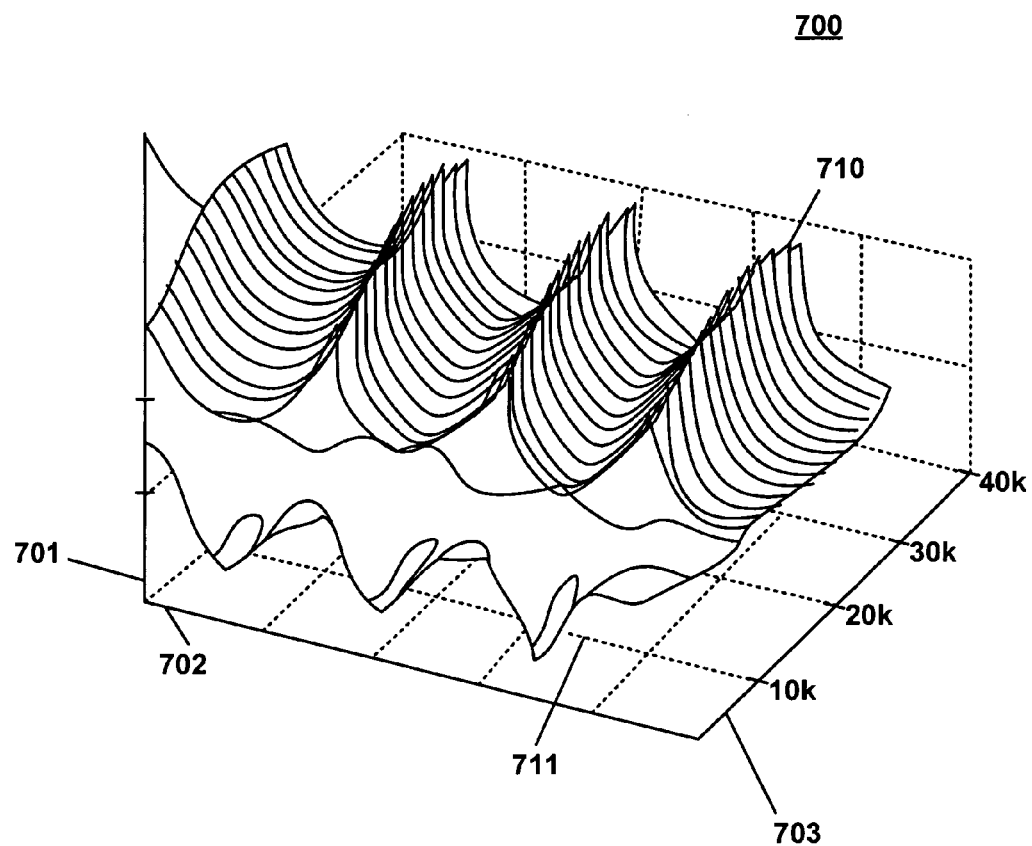
FIG. 7 is a three dimensional graph for discerning the mechanical behavior of a hard disk drive relative to a particular excitation frequency associated with the rotation of a hard disk controlled by a servo writing system in accordance with an embodiment of the present invention.

Still referring to FIG. 4, FIG. 7 is a three-dimensional graph 700 illustrating the results of a scan performed across the surface of a hard disk 115 showing the mechanical behavior of a particular frequency response, in an embodiment of the present invention. In the present embodiment, the frequency response is at approximately 96. Graph 700 includes a vertical axis (x) 701 representing amplitude, a horizontal axis (y) 702 representing SID (?) and a longitudinal axis (z) 703 representing cylinders (0-40$k$) in a hard disk 115.

Still referring to FIG. 7, the high frequency RRO was partially phase coherent from the outer diameter track to the inner diameter track of hard disk 115. This infers that the 96

RRO response was primarily caused by motor excitation during a servo writing process. Graph 700 further illustrates that the response amplitude and phase variation at approximately cylinder 10k indicates that certain operational modes associated with the spindle motor are related to the excitation.

It is noted that the phase is coherent from cylinder 0 to approximately cylinder 10k of hard disk 115, shown as point 711. The phase is also coherent from approximately cylinder 10k to inner diameter, point 710. This is an indication of motor excitation related dynamics. Alternatively, with regard to actuator dynamics at servo track writing speed, this would indicate a written in non-phase coherent RRO. Graph 700 shows the phase changes at approximately cylinder 10k, which can relate to relative dynamic motion of disk vibrations, e.g., disk vibration as a result of a nodal circle of the spindle motor, e.g., a non-concentric elliptical rotation.

In step 430 of process 400 and in conjunction with part 3 of Equation 1, the STW motor controller current profile is adjusted. The adjustment rounds (also referred to a softens) the profile of the digital waveform, in an embodiment of the present invention. Subsequent to the completion of step 420, above, step 430 is initiated to optimize the frequency content of the excitation level. Because sharp corners are commonly known be a primary cause of high frequency noise, the frequency content of the excitation frequency is further optimized so as to soften the corners in the waveform. It is noted, however, that smoothing the current profile can potentially increase risk of STW timing which directly results in bad track quality. Accordingly, embodiments of the present invention provide for a rounding of the waveform while minimizing increases in undesired track quality.

Figure 8A:
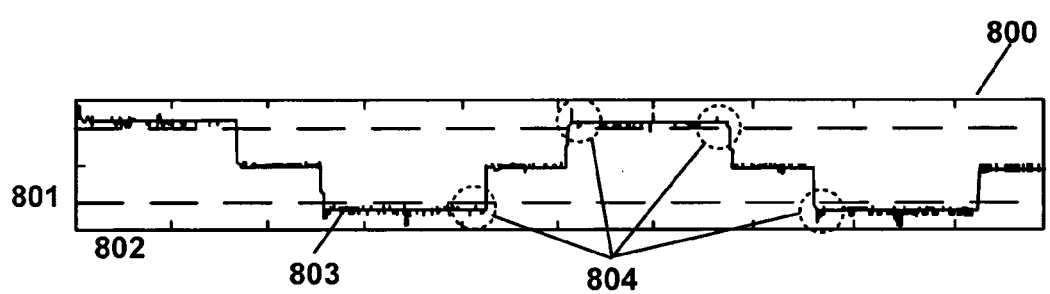
FIG. 8A is graph showing a waveform of a motor controller DC gain associated with a conventional servo track writer.

FIG. 8A is a graph 800 illustrating the square waveform representing a controller motor current profile of a conventional servo track writer for writing servo track information. Graph 800 includes a vertical axis 801 representing positive and negative applied voltage and a horizontal axis 802 representing time. Graph 800 also includes a line 803 representing the conventional waveform of the STW controller motor current profile. It is noted that line 803 also includes a plurality of sharp corner areas 804. It is further noted that it is commonly known that a waveform having sharp corner areas, e.g., corners 804 of waveform 803, inherently causes high frequency noise.

Figure 8B:
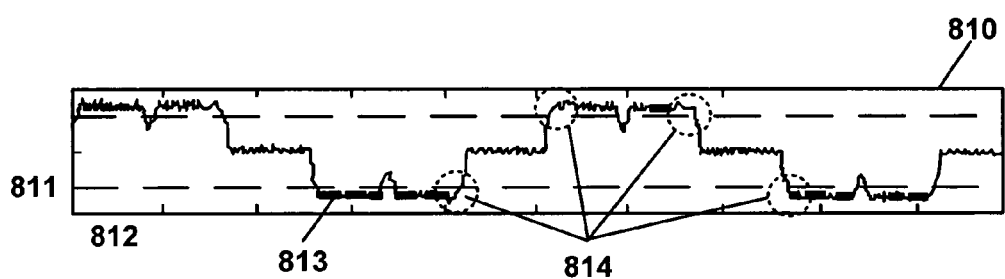
FIG. 8B is a graph showing a waveform of the motor controller DC gain of the servo writing system in accordance with an embodiment of the present invention.

FIG. 8B is a graph 810 illustrating a softened or rounded waveform representing the controller motor current profile of servo writing system 220, in accordance with an embodiment of the present invention and practiced upon a hard disk drive, e.g., hard disk drive 111. Graph 810 includes a vertical axis 811 representing applied positive and negative voltage and a horizontal axis 812 representing time. Graph 810 also includes a line 813 representing the STW controller motor current profile that has a plurality of softened corner areas 814. Through implementation of equation 1, the waveform as seen in FIG. 8A has had the sharp corners rounded, such that a reduction in high frequency noise is achieved.

Figure 9:
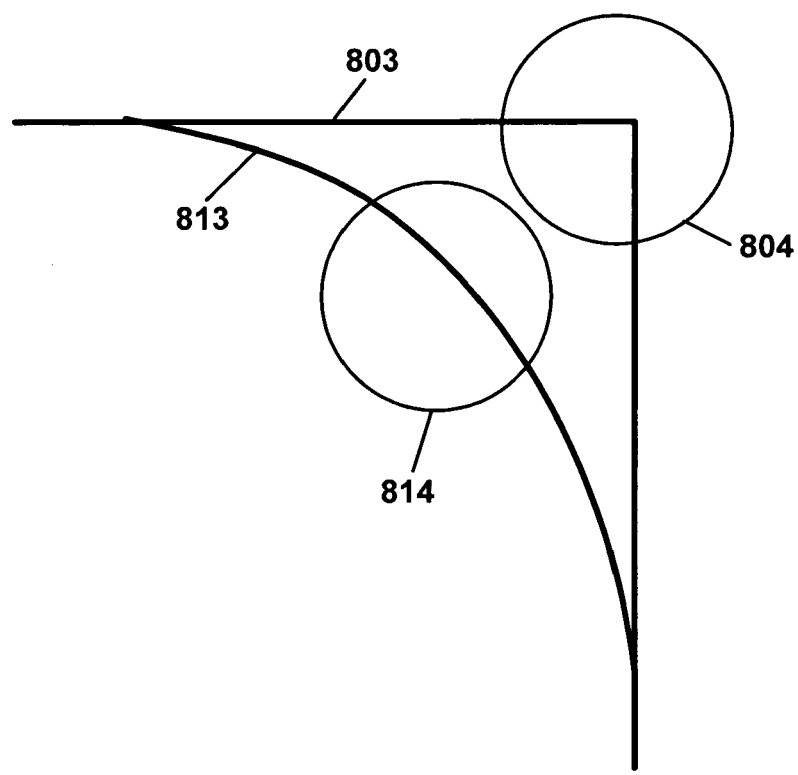
FIG. 9 is a diagram illustrating the difference of the sharp waveform of FIG. 8A and the rounded waveform of FIG. 8B, in accordance with an embodiment of the present invention.

FIG. 9, in conjunction with step 430 of FIG. 4 and FIGS. 8A and 8B, is an illustration 900 comparing the waveform of a controller motor current profile of a conventional servo track writer, e.g., waveform 803 of FIG. 8A, with the waveform of a controller motor current profile of servo writing system 220, e.g., waveform 813 of FIG. 8B, having had performed thereon an embodiment of the present invention, e.g., step 430 of process 400 of FIG. 4. As can be discerned in illustration 900, the waveform representing the servo writing system 220 controller motor current profile, e.g., waveform 813, and in accordance with an embodiment of the present invention, has a substantially rounded corner characteristic profile as compared to the sharp corner characteristical waveform of a conventional servo track writer motor controller current profile, e.g., corner profile 804 of waveform 803. Thus, embodiments of the present invention provide for an optimized waveform in terms of file level RRO, STW timing and quality, STW yield and function test yield while reducing instances of high frequency noise.

Figure 10A:
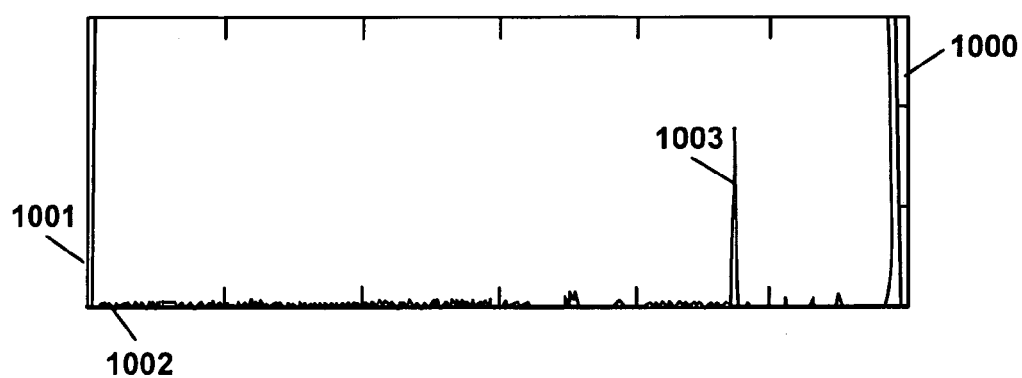
FIG. 10A is a graph showing the motor current frequency content of a conventional servo track writer.

With reference still to FIG. 4 and Equation 1, FIG. 10A is a graph 1000 illustrating the frequency or excitation content of a waveform of a conventional STW controller motor current profile, e.g., profile 803 of FIGS. 8A and 9. Graph 1000 includes a vertical axis 1001 representing the amplitude of the excitation content which ranges from a zero value to a value of three. Graph 1000 also includes a horizontal axis 1002 representing the frequency of the excitation content which ranges from zero to 12 K Hz. Graph 1000 shows a line 1003 at a frequency that approximates 96 K Hz. having an amplitude value of approximately two.

Figure 10B:
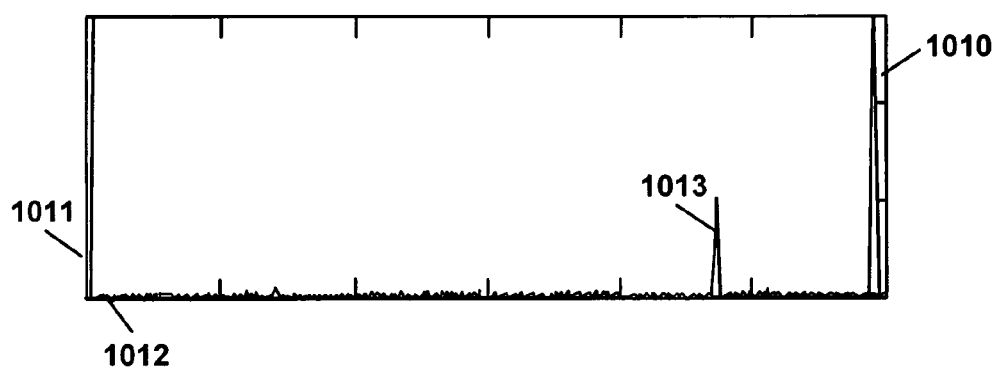
FIG. 10B is a graph showing the motor current frequency content of a servo writing system in accordance with an embodiment of the present invention.

FIG. 10B is a graph 1010 illustrating the frequency or excitation content of a waveform of an STW controller motor current profile in accordance with an embodiment of the present invention, e.g., profile 813 of FIGS. 8B and 9. Graph 1010 includes a vertical axis 1011 representing the amplitude of the excitation content which ranges from a zero value to a value of three. Graph 1010 also includes a horizontal line 1012 representing the frequency of the excitation content which ranges from zero to 12 K Hz. Graph 1010 shows a line 1013 at frequency approximating 96 K HZ having an amplitude value less than one.

Referring combinationally to FIGS. 10A and 10B, FIG. 10B shows a substantial reduction (approximately sixty percent) in amplitude of the excitation content of a waveform in accordance with an embodiment of the present invention when compared to the frequency or excitation content of a conventional waveform, e.g., FIG. 10A.

Still referring to FIG. 4, combining the steps 410, 420 and 430 of FIG. 4 in conjunction with Equation 1, FIGS. 11A-11F, 12A-12F and 13A-13F illustrate how the written in high frequency RRO TMR is reduced by using optimization methods in accordance with an embodiment of the present invention. Particularly, with attention to how overall long-tailed (red) distribution is improved to "normal" distribution shape in green with the optimization methods. With reference now to FIGS. 11A-11F, FIG. 11A is a graph 1100 illustrating the distribution relative to the inner diameter of a hard disk 115 which shows a reduction in RRO in accordance with an embodiment of the present invention. Graph 1100 represents RRO values obtained from tracks approximate to the inner diameter of a hard disk 115. Graph 1100 includes a vertical axis 1101 representing a value of 0 to 1.0, being increased by 0.2 and a horizontal axis 1102 representing a percentage of track pitch rms at 89 kTPI (kilo tracks per inch). Graph 1100 also includes a line 1103 and a line 1104. Line 1104 represents a 'long-tailed' distribution RRO value (known to be a performance barrier) obtained during conventional servo track writing. As shown, line 1104 extends to the right in an almost horizontal direction (long-tailed) toward the top of graph 1100. This is indicative of excessive RRO present during conventional servo track writing. Line 1103 represents an RRO value obtained during servo track writing in accordance with an implementation of an embodiment of the present invention. Line 1103 illustrates a substantial improvement over the long-tailed distribution, depicting an achieved reduction in RRO during servo track writing when compared to line 1104.

Figure 11A:
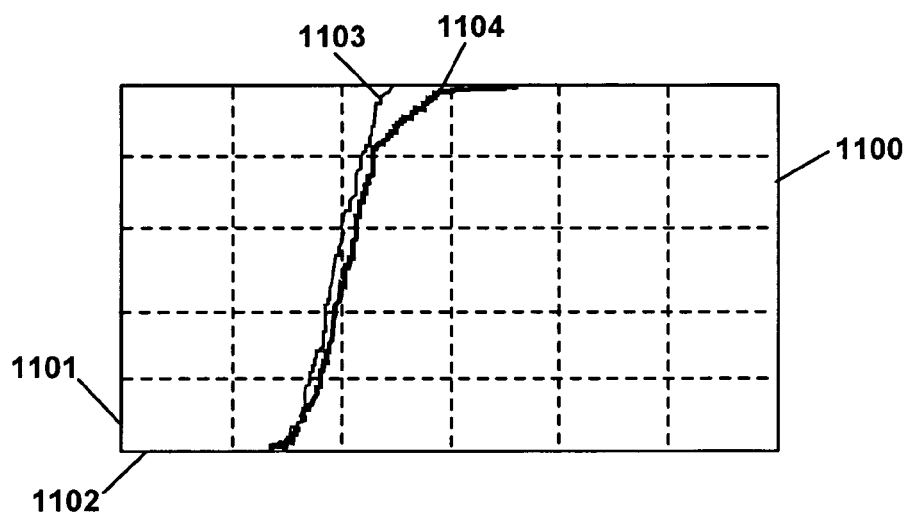
FIG. 11A is a graph comparing the cumulative distribution, as it pertains to the inner diameter of a hard disk, of a conventional servo track writer and a servo writing system in accordance with an embodiment of the present invention.
Figure 11B:
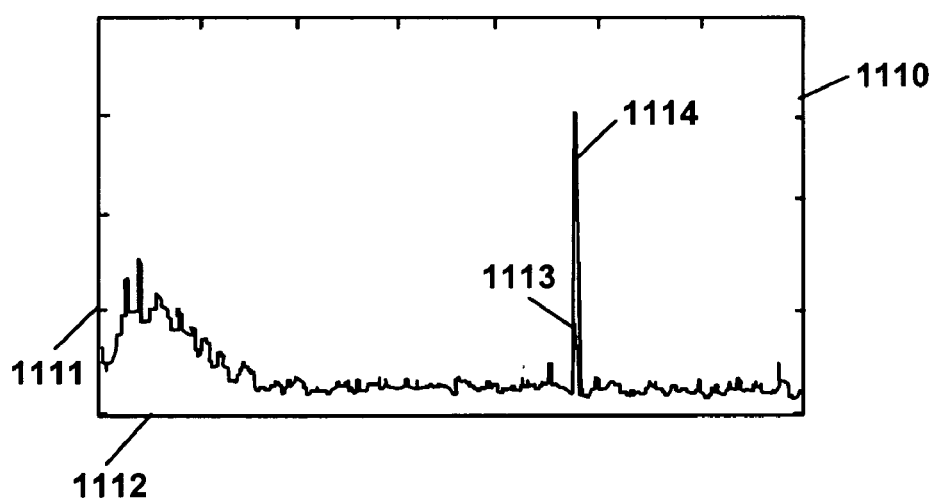
FIG. 11B is a graph comparing the magnitude of the frequency spectra, as it pertains to the inner diameter of a hard disk, of a conventional servo track writer and a servo writing system in accordance with an embodiment of the present invention.

FIG. 11B is a graph 1110 illustrating the amplitude of the harmonics in the frequency spectrum (energy) of the RRO as it pertains to the inner diameter of a hard disk 115. Graph 1110 includes a vertical axis 1111 representing the percentage of track pitch rms and a horizontal axis 1112 representing the frequency harmonics. Graph 1110 also includes a darker indicator 1114 and a lighter indicator 1113. Darker indicator 1114 shows the frequency amplitude of a conventional servo track writing process while lighter indicator 1113 shows the frequency amplitude of a servo track writing process in accordance with an embodiment of the present invention. Thus, in the embodiment shown, the present invention can substantially reduce harmonic amplitude present in high frequency written in RRO TMR.

Figure 11C:
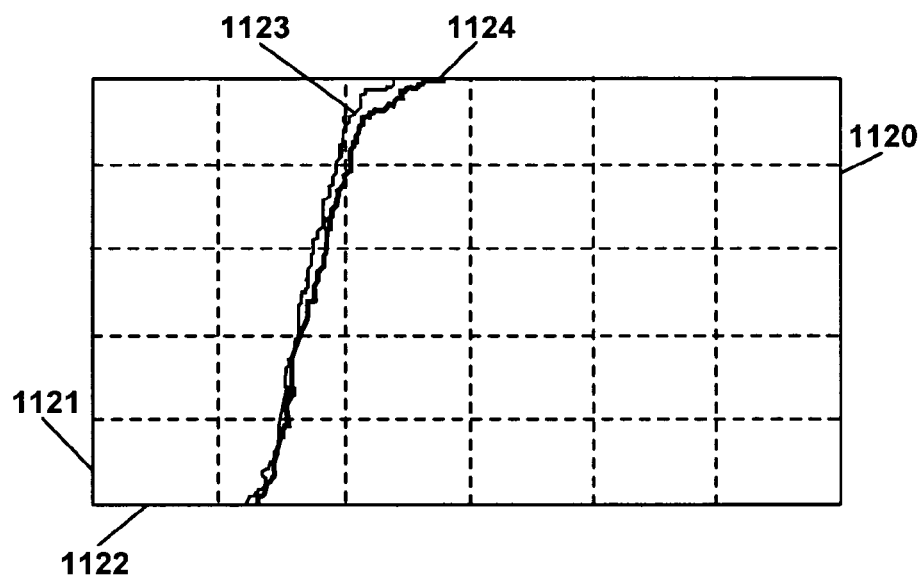
FIG. 11C is a graph comparing the cumulative distribution, as it pertains to the middle diameter of a hard disk, of a conventional servo track writer and a servo writing system in accordance with an embodiment of the present invention.
Figure 11D:
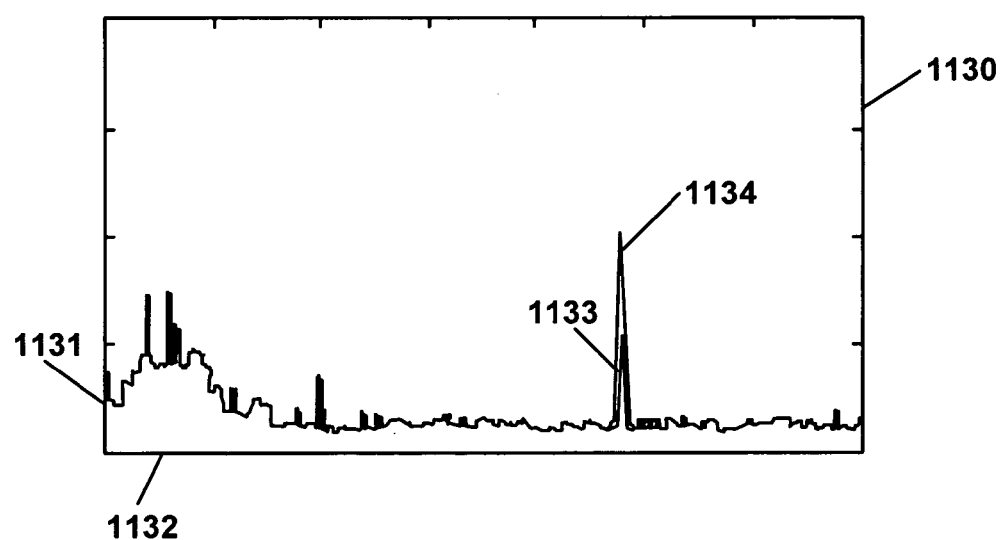
FIG. 11D is a graph comparing the magnitude of the frequency spectra, as it pertains to the middle diameter of a hard disk, of a conventional servo track writer and a servo writing system in accordance with an embodiment of the present invention.

FIGS. 11C and 11D are representative of values obtained relative to the middle diameter of a hard disk 115. FIG. 11C is a graph 1120 illustrating the distribution relative to the middle diameter of a hard disk 115 which shows a reduction in RRO in accordance with an embodiment of the present invention. Graph 1120 represents RRO values obtained from tracks approximate to the middle diameter of a hard disk 115. Graph 1120 includes a vertical axis 1121 representing a value of 0 to 1.0, being increased by 0.2 and a horizontal axis 1122 representing a percentage of track pitch rms at 89 kTPI (kilo tracks per inch). Graph 1120 also includes a line 1123 and a line 1124. Line 1124 represents a 'long-tailed' distribution RRO value (known to be a performance barrier) obtained during conventional servo track writing. As shown, line 1124 extends to the right in an almost horizontal direction (long-tailed) toward the top of graph 1120. This is indicative of excessive RRO present during conventional servo track writing. Line 1123 represents an RRO value obtained during servo track writing in accordance with an implementation of an embodiment of the present invention. Line 1123 illustrates a substantial improvement over the long-tailed distribution, depicting an achieved reduction in RRO during servo track writing when compared to line 1124.

FIG. 11D is a graph 1130 illustrating the amplitude of the harmonics in the frequency spectrum (energy) of the RRO as it pertains to the middle diameter of a hard disk 115. Graph 1130 includes a vertical axis 1131 representing the percentage of track pitch rms and a horizontal axis 1132 representing the frequency harmonics. Graph 1130 also includes a darker indicator 1134 and a lighter indicator 1133. Darker indicator 1134 shows the frequency amplitude of a conventional servo track writing process while lighter indicator 1133 shows the frequency amplitude of a servo track writing process in accordance with an embodiment of the present invention. Thus, in the embodiment shown, the present invention can substantially reduce harmonic amplitude present in high frequency written in RRO TMR.

Figure 11E:
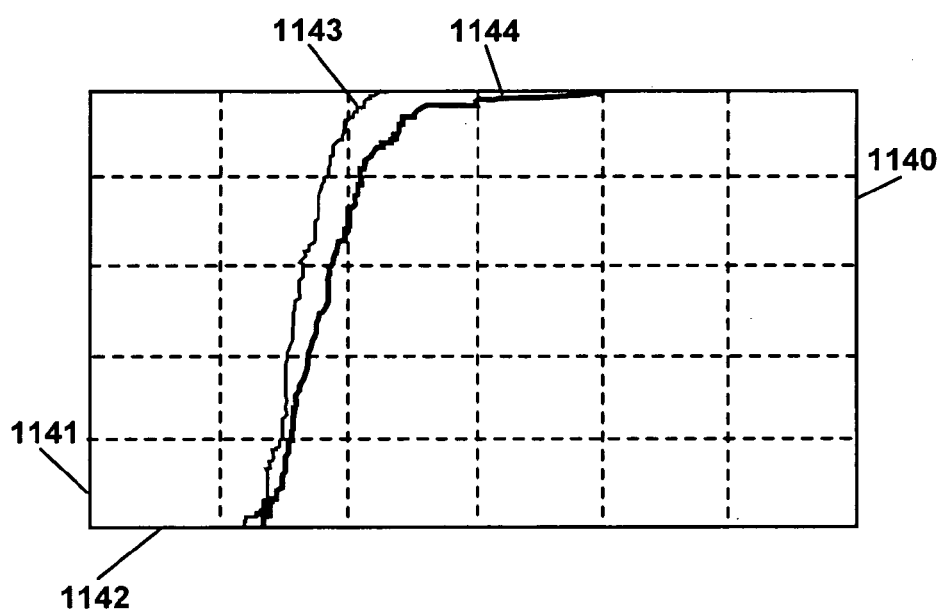
FIG. 11E is a graph comparing the cumulative distribution, as it pertains to the outer diameter of a hard disk, of a conventional servo track writer and a servo writing system in accordance with an embodiment of the present invention.
Figure 11F:
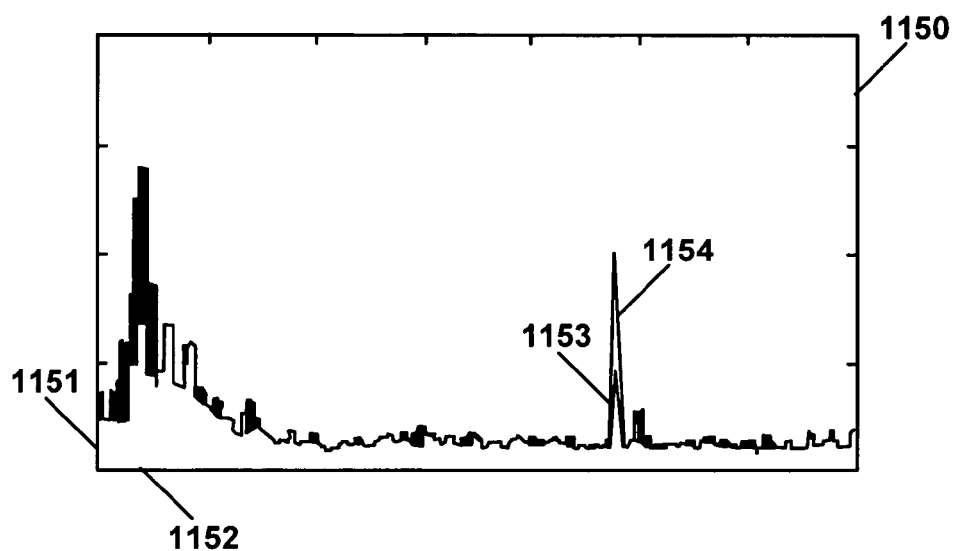
FIG. 11F is a graph comparing the magnitude of the frequency spectra, as it pertains to the outer diameter of a hard disk, of a conventional servo track writer and a servo writing system in accordance with an embodiment of the present invention.

FIGS. 11E and 11F are representative of values obtained relative to the outer diameter of a hard disk 115. FIG. 11E is a graph 1140 illustrating the distribution relative to the outer diameter of a hard disk 115 which shows a reduction in RRO in accordance with an embodiment of the present invention. Graph 1140 represents RRO values obtained from tracks approximate to the outer diameter of a hard disk 115. Graph 1140 includes a vertical axis 1141 representing a value of 0 to 1.0, being increased by 0.2 and a horizontal axis 1142 representing a percentage of track pitch rms at 89 kTPI (kilo tracks per inch). Graph 1140 also includes a line 1143 and a line 1144. Line 1144 represents a 'long-tailed' distribution RRO value (known to be a performance barrier) obtained during conventional servo track writing. As shown, line 1144 extends to the right in an almost horizontal direction (long-tailed) toward the top of graph 1140. This is indicative of excessive RRO present during conventional servo track writing. Line 1143 represents an RRO value obtained during servo track writing in accordance with an implementation of an embodiment of the present invention. Line 1143 illustrates a substantial improvement over the long-tailed distribution, depicting an achieved reduction in RRO during servo track writing when compared to line 1144.

FIG. 11F is a graph 1150 illustrating the amplitude of the harmonics in the frequency spectrum (energy) of the RRO as it pertains to the outer diameter of a hard disk 115. Graph 1150 includes a vertical axis 1151 representing the percentage of track pitch rms and a horizontal axis 1152 representing the frequency harmonics. Graph 1150 also includes a darker indicator 1154 and a lighter indicator 1153. Darker indicator 1154 shows the frequency amplitude of a conventional servo track writing process while lighter indicator 1153 shows the frequency amplitude of a servo track writing process in accordance with an embodiment of the present invention. Thus, in the embodiment shown, the present invention can substantially reduce harmonic amplitude present in high frequency written in RRO TMR.

Figure 12A:
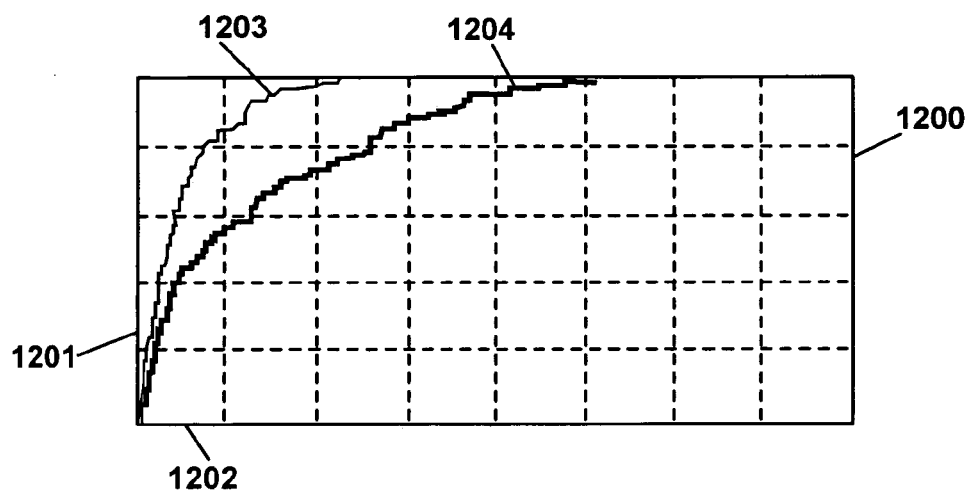
FIG. 12A is a graph comparing the RRO TMR, as it relates to the inner diameter of a hard disk in a hard disk drive and to a particular mechanical and frequency harmonic, present in a conventional servo track writer and the reduction of RRO TMR achieved in a servo writing system in accordance with an embodiment of the present invention.

FIG. 12A is a graph 1200 illustrating RRO TMR present in a conventional servo track writer in comparison to reduced RRO TMR achieved with and provided by a servo writing system, e.g., 220, in accordance with an embodiment of the present invention. Graph 1200 relates to the inner diameter of a hard disk in a hard disk drive and is representative of a particular mechanical and harmonic excitation frequency. In the present embodiment, the frequency is approximately 96 times. Graph 1200 includes a vertical axis 1201 and a horizontal axis 1202 representing the extent of the repeatable run out and track mis-registration. Graph 1200 includes a line 1204 representing the extent of the RRO TMR present in a conventional servo track writer as a percentage of track pitch rms at 89 kTPI. Graph 1200 also includes a line 1203 representing the extent of the RRO TMR present in servo writing system 220 as a percentage of track pitch rms at 89 kTPI. It is noted that line 1203 shows a substantial reduction in RRO when compared to line 1204.

Figure 12B:
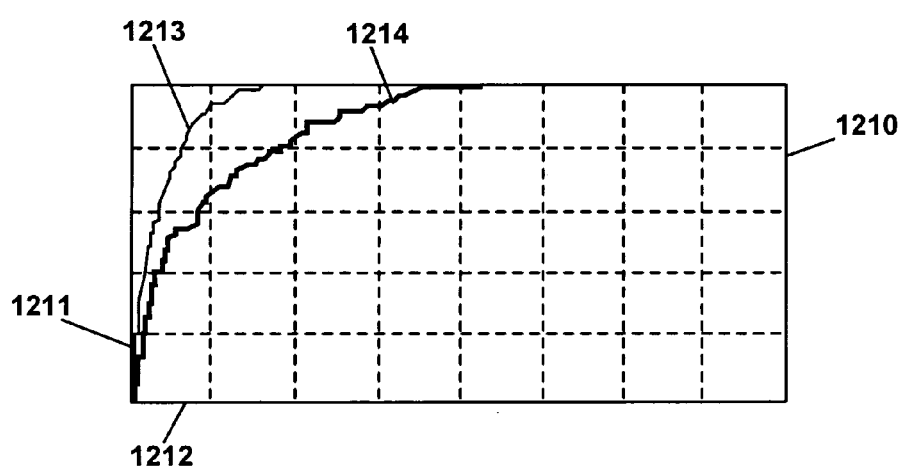
FIG. 12B is a graph comparing the RRO TMR, as it relates to the middle diameter of a hard disk in a hard disk drive and to a particular mechanical and frequency harmonic, present in a conventional servo track writer and the reduction of RRO TMR achieved in a servo writing system in the present embodiment.

FIG. 12B is a graph 1210 illustrating RRO TMR present in a conventional servo track writer in comparison to reduced RRO TMR achieved with and provided by a servo writing system, e.g., 220, in accordance with an embodiment of the present invention. Graph 1210 relates to the middle diameter of a hard disk in a hard disk drive and is representative of a particular mechanical and harmonic excitation frequency. In the present embodiment, the frequency is approximately 96 times. Graph 1210 includes a vertical axis 1211 and a horizontal axis 1212 representing the extent of the repeatable run out and track mis-registration. Graph 1210 includes a line 1214 representing the extent of the RRO TMR present in a conventional servo track writer as a percentage of track pitch rms at 89 kTPI. Graph 1210 also includes a line 1213 representing the extent of the RRO TMR present in servo writing system 220 as a percentage of track pitch rms at 89 kTPI. It is noted that line 1213 shows a substantial reduction in RRO when compared to line 1214.

Figure 12C:
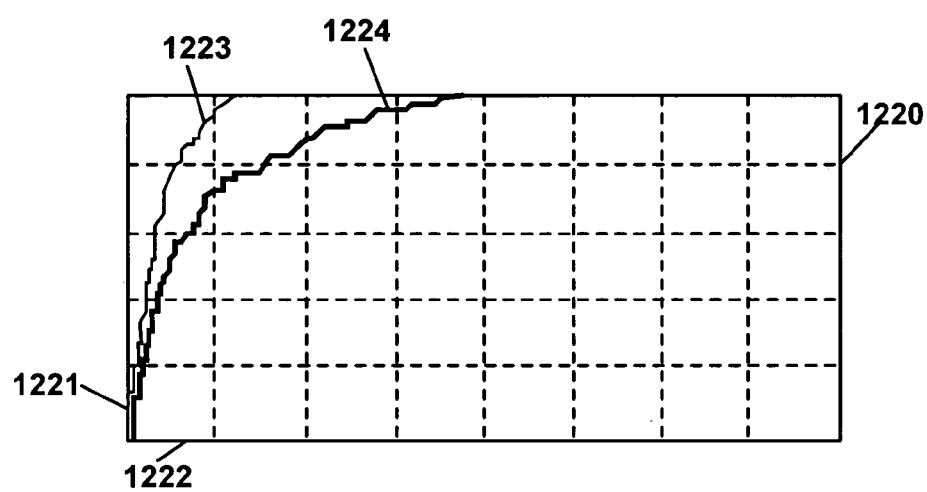
FIG. 12C is a graph comparing the RRO TMR, as it relates to the outer diameter of a hard disk in a hard disk drive and to a particular mechanical and frequency harmonic, present in a conventional servo track writer and the reduction of RRO TMR achieved in a servo writing system in the present embodiment.

FIG. 12C is a graph 1220 illustrating RRO TMR present in a conventional servo track writer in comparison to reduced RRO TMR achieved with and provided by a servo writing system, e.g., 220, in accordance with an embodiment of the present invention. Graph 1220 relates to the outer diameter of a hard disk in a hard disk drive and is representative of a particular mechanical and harmonic excitation frequency. In the present embodiment, the frequency is approximately 96 times. Graph 1220 includes a vertical axis 1221 and a horizontal axis 1222 representing the extent of the repeatable run out and track mis-registration. Graph 1220 includes a line 1224 representing the extent of the RRO TMR present in a conventional servo track writer as a percentage of track pitch rms at 89 kTPI. Graph 1220 also includes a line 1223 representing the extent of the RRO TMR present in servo writing system 220 as a percentage of track pitch rms at 89 kTPI. It is noted that line 1223 shows a substantial reduction in RRO when compared to line 1224.

Figure 12D:
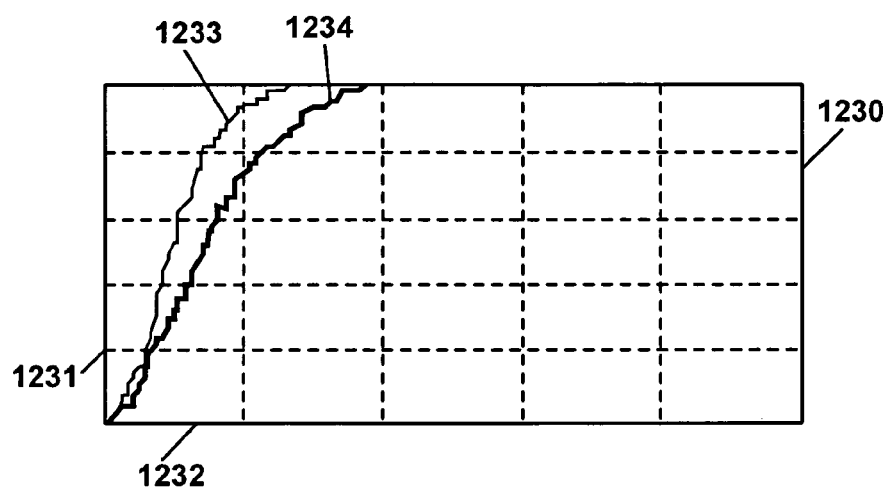
FIG. 12D is a graph comparing the RRO TMR, as it relates to the inner diameter of a hard disk in a hard disk drive and to another particular mechanical and frequency harmonic, present in a conventional servo track writer and the reduction of RRO TMR achieved in a servo writing system in accordance with an embodiment of the present invention.

FIG. 12D is a graph 1230 illustrating RRO TMR present in a conventional servo track writer in comparison to reduced RRO TMR achieved with and provided by a servo writing system, e.g., 220, in accordance with an embodiment of the present invention. Graph 1230 relates to the inner diameter of a hard disk in a hard disk drive and is representative of a particular mechanical and harmonic excitation frequency. In the present embodiment, the frequency is approximately 100 times. Graph 1230 includes a vertical axis 1231 and a horizontal axis 1232 representing the extent of the repeatable run out and track mis-registration. Graph 1230 includes a line 1234 representing the extent of the RRO TMR present in a conventional servo track writer as a percentage of track pitch rms at 89 kTPI. Graph 1230 also includes a line 1233 representing the extent of the RRO TMR present in servo writing system 220 as a percentage of track pitch rms at 89 kTPI. It is noted that line 1233 shows a substantial reduction in RRO when compared to line 1234.

Figure 12E:
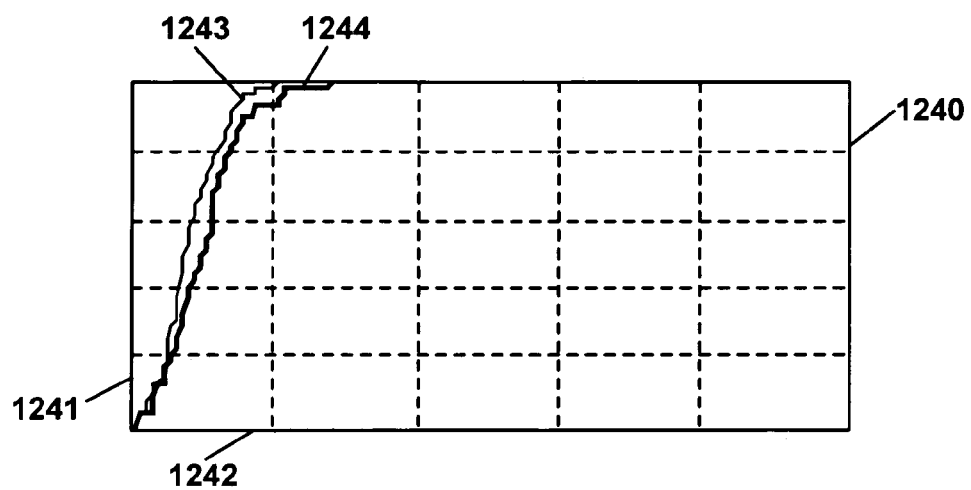
FIG. 12E is a graph comparing the RRO TMR, as it relates to the middle diameter of a hard disk in a hard disk drive and to another particular mechanical and frequency harmonic, present in a conventional servo track writer and the reduction of RRO TMR achieved in a servo writing system in the present embodiment.

FIG. 12E is a graph 1240 illustrating RRO TMR present in a conventional servo track writer in comparison to reduced RRO TMR achieved with and provided by a servo writing system, e.g., 220, in accordance with an embodiment of the present invention. Graph 1240 relates to the middle diameter of a hard disk in a hard disk drive and is representative of a particular mechanical and harmonic excitation frequency. In the present embodiment, the frequency is approximately 100 times. Graph 1240 includes a vertical axis 1241 and a horizontal axis 1242 representing the extent of the repeatable run out and track mis-registration. Graph 1240 includes a line 1244 representing the extent of the RRO TMR present in a conventional servo track writer as a percentage of track pitch rms at 89 kTPI. Graph 1240 also includes a line 1243 representing the extent of the RRO TMR present in servo writing system 220 as a percentage of track pitch rms at 89 kTPI. It is noted that line 1243 shows a reduction in RRO when compared to line 1244.

Figure 12F:
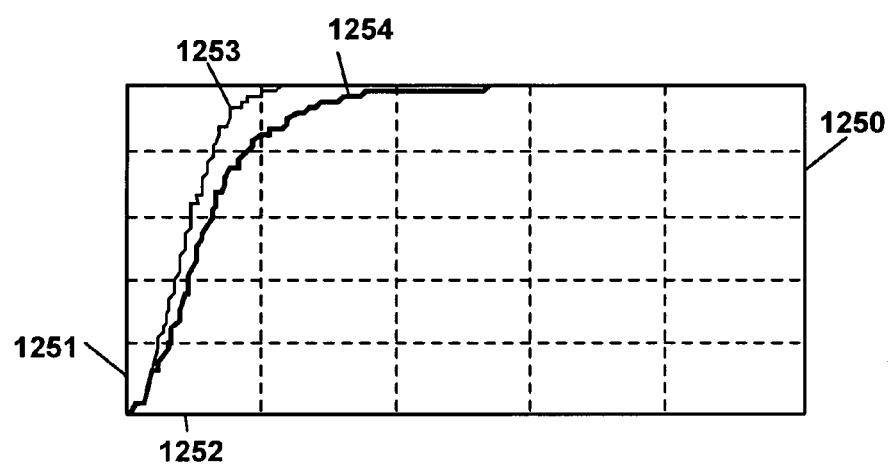
FIG. 12F is a graph comparing the RRO TMR, as it relates to the outer diameter of a hard disk in a hard disk drive and to another particular mechanical and frequency harmonic, present in a conventional servo track writer and the reduction of RRO TMR achieved in a servo writing system in the present embodiment.

FIG. 12F is a graph 1250 illustrating RRO TMR present in a conventional servo track writer in comparison to reduced RRO TMR achieved with and provided by a servo writing system, e.g., 220, in accordance with an embodiment of the present invention. Graph 1250 relates to the outer diameter of a hard disk in a hard disk drive and is representative of a particular mechanical and harmonic excitation frequency. In the present embodiment, the frequency is approximately 100 times. Graph 1250 includes a vertical axis 1221 and a horizontal axis 1222 representing the extent of the repeatable run out and track mis-registration. Graph 1250 includes a line 1254 representing the extent of the RRO TMR present in a conventional servo track writer as a percentage of track pitch rms at 89 kTPI. Graph 1250 also includes a line 1253 representing the extent of the RRO TMR present in servo writing system 220 as a percentage of track pitch rms at 89 kTPI. It is noted that line 1253 shows a substantial reduction in RRO when compared to line 1254.

Figure 13A:
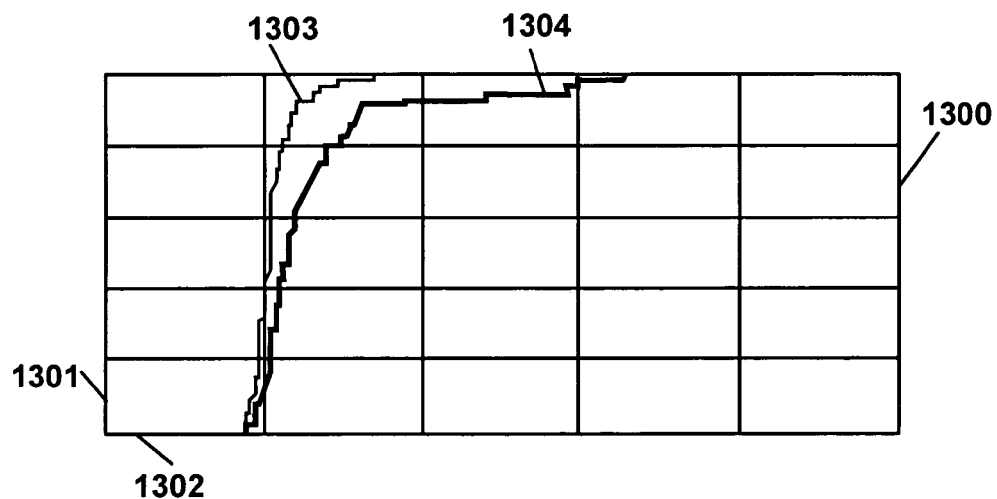
FIG. 13A is a graph illustrating a reduction in RRO TMR achieved with a servo writing system in accordance with an embodiment of the present invention, as it pertains to the inner diameter of a hard disk in a hard disk drive, compared with the RRO TMR of a conventional servo track writer.

FIG. 13A is a graph 1300 illustrating the distribution relative to the inner diameter of a hard disk 115 which shows a reduction in RRO in accordance with an embodiment of the present invention. Graph 1300 represents RRO values obtained from tracks approximate to the inner diameter of a hard disk 115. Graph 1300 includes a vertical axis 1301 representing a value of 0 to 1.0, being increased by 0.2 and a horizontal axis 1302 representing a percentage of track pitch rms at 89 kTPI (kilo tracks per inch). Graph 1300 also includes a line 1303 and a line 1304. Line 1304 represents a 'long-tailed' distribution RRO value (known to be a performance barrier) obtained during conventional servo track writing. As shown, line 1304 extends to the right in an almost horizontal direction (long-tailed) toward the top of graph 1300. This is indicative of excessive RRO present during conventional servo track writing. Line 1303 represents an RRO value obtained during servo track writing performed by a servo writing system 220 in accordance with an implementation of an embodiment of the present invention. Line 1303 illustrates a substantial improvement over the long-tailed distribution, depicting an achieved reduction in RRO during servo track writing when compared to line 1304.

Figure 13B:
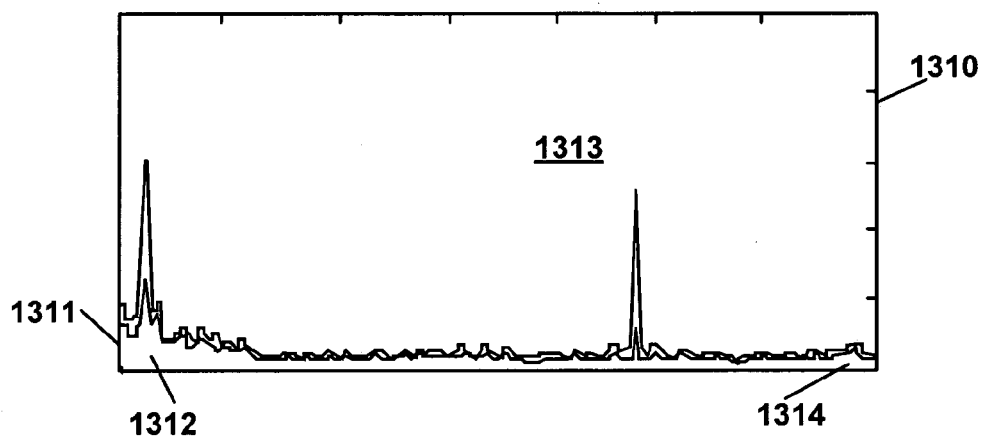
FIG. 13B is a graph illustrating an achieved reduction in the magnitude of the RRO TMR, as shown in FIG. 13A, of a servo writing system in accordance with an embodiment of the present invention and the magnitude of the RRO TMR of a conventional servo track writer.

FIG. 13B is a graph 1310 illustrating the amplitude of the harmonics in the frequency spectrum (energy) of the RRO as it pertains to the inner diameter of a hard disk 115. Graph 1310 includes a vertical axis 1311 representing the percentage of track pitch rms and a horizontal axis 1312 representing the frequency harmonics. Graph 1310 also includes a darker indicator 1314 and a lighter indicator 1313. Darker indicator 1314 shows the frequency amplitude of a conventional servo track writing process while lighter indicator 1313 shows the frequency amplitude of a servo track writing process by a servo writing system 220 in accordance with an embodiment of the present invention. Thus, in the embodiment shown, the present invention can substantially reduce harmonic amplitude present in high frequency written in RRO TMR.

Figure 13C:
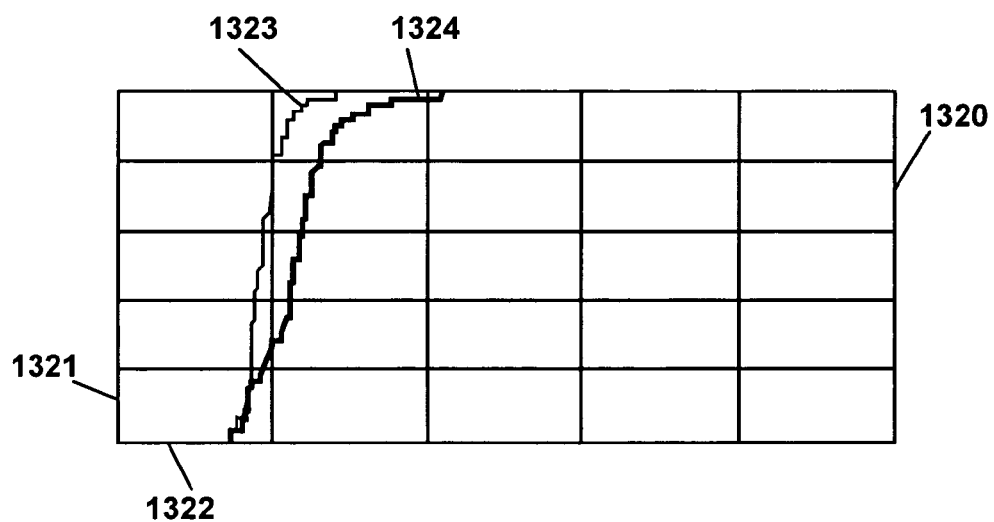
FIG. 13C is a graph illustrating a reduction in RRO TMR achieved with a servo writing system in accordance with an embodiment of the present invention, as it pertains to the middle diameter of a hard disk in a hard disk drive, compared with the RRO TMR of a conventional servo track writer.

FIG. 13C is a graph 1320 illustrating the distribution relative to the middle diameter of a hard disk 115 which shows a reduction in RRO in accordance with an embodiment of the present invention. Graph 1320 represents RRO values obtained from tracks approximate to the middle diameter of a hard disk 115. Graph 1320 includes a vertical axis 1321 representing a value of 0 to 1.0, being increased by 0.2 and a horizontal axis 1322 representing a percentage of track pitch rms at 89 kTPI (kilo tracks per inch). Graph 1320 also includes a line 1323 and a line 1324. Line 1324 represents a 'long-tailed' distribution RRO value (known to be a performance barrier) obtained during conventional servo track writing. As shown, line 1324 extends to the right in an almost horizontal direction (long-tailed) toward the top of graph 1320. This is indicative of excessive RRO present during conventional servo track writing. Line 1323 represents an RRO value obtained during servo track writing in accordance with an implementation of an embodiment of the present invention. Line 1323 illustrates a substantial improvement over the long-tailed distribution, depicting an achieved reduction in RRO during servo track writing when compared to line 1324.

Figure 13D:
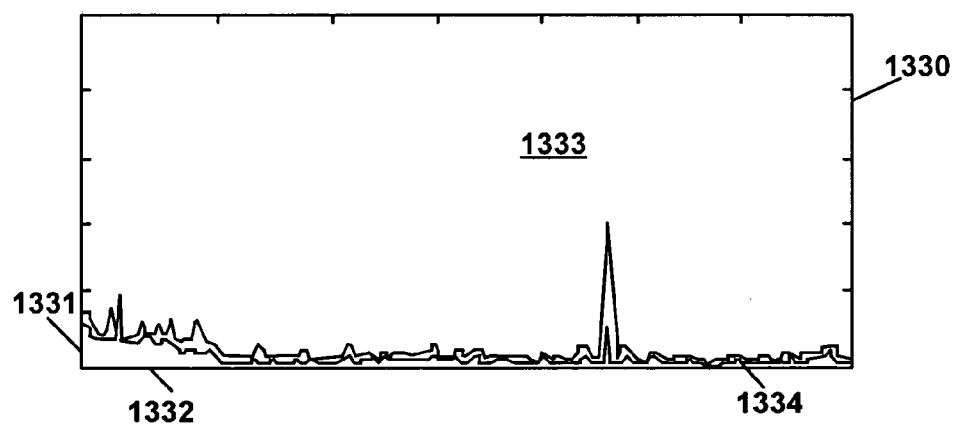
FIG. 13D is a graph illustrating an achieved reduction in the magnitude of the RRO TMR, as shown in FIG. 13C, of a servo writing system in accordance with an embodiment of the present invention and the magnitude of the RRO TMR of a conventional servo track writer.

FIG. 13D is a graph 1330 illustrating the amplitude of the harmonics in the frequency spectrum (energy) of the RRO as it pertains to the middle diameter of a hard disk 115. Graph 1330 includes a vertical axis 1331 representing the percentage of track pitch rms and a horizontal axis 1332 representing the frequency harmonics. Graph 1330 also includes a darker indicator 1334 and a lighter indicator 1333. Darker indicator 1334 shows the frequency amplitude of a conventional servo track writing process while lighter indicator 1333 shows the frequency amplitude of a servo track writing process in accordance with an embodiment of the present invention. Thus, in the embodiment shown, the present invention can substantially reduce harmonic amplitude present in high frequency written in RRO TMR.

Figure 13E:
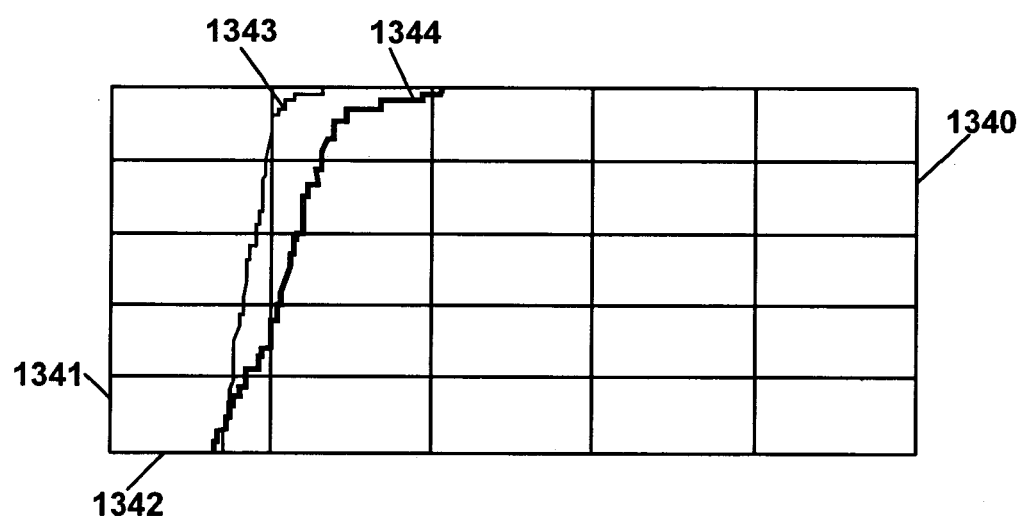
FIG. 13E is a graph illustrating a reduction in RRO TMR achieved with a servo writing system in accordance with an embodiment of the present invention, as it pertains to the outer diameter of a hard disk in a hard disk drive, compared with the RRO TMR of a conventional servo track writer.

FIG. 13E is a graph 1340 illustrating the distribution relative to the outer diameter of a hard disk 115 which shows a reduction in RRO in accordance with an embodiment of the present invention. Graph 1340 represents RRO values obtained from tracks approximate to the outer diameter of a hard disk 115. Graph 1340 includes a vertical axis 1341 representing a value of 0 to 1.0, being increased by 0.2 and a horizontal axis 1342 representing a percentage of track pitch rms at 89 kTPI (kilo tracks per inch). Graph 1340 also includes a line 1343 and a line 1344. Line 1344 represents a 'long-tailed' distribution RRO value (known to be a performance barrier) obtained during conventional servo track writing. As shown, line 1344 extends to the right in an almost horizontal direction (long-tailed) toward the top of graph 1340. This is indicative of excessive RRO present during conventional servo track writing. Line 1343 represents an RRO value obtained during servo track writing in accordance with an implementation of an embodiment of the present invention. Line 1343 illustrates a substantial improvement over the long-tailed distribution, depicting an achieved reduction in RRO during servo track writing when compared to line 1344.

Figure 13F:
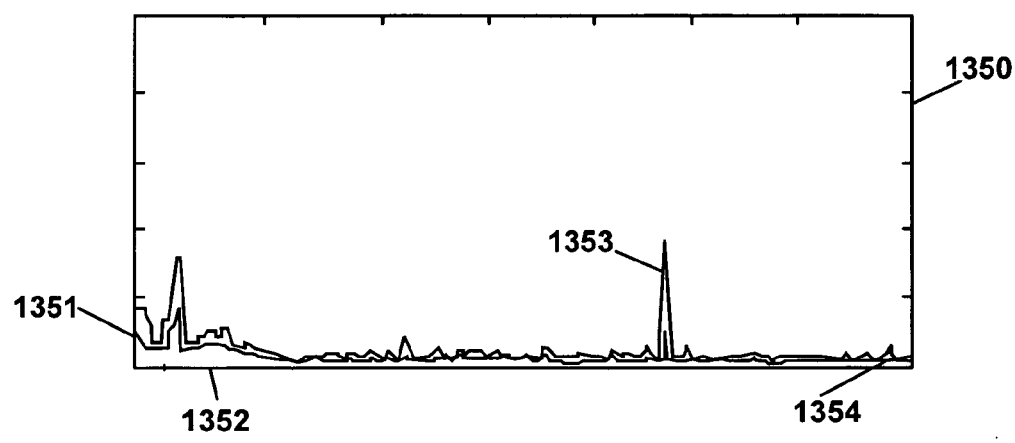
FIG. 13F is a graph illustrating an achieved reduction in the magnitude of the RRO TMR, as shown in FIG. 13E, of a servo writing system in accordance with an embodiment of the present invention in comparison to the magnitude of the RRO TMR of a conventional servo track writer.

FIG. 13F is a graph 1350 illustrating the amplitude of the harmonics in the frequency spectrum (energy) of the RRO as it pertains to the outer diameter of a hard disk 115. Graph 1350 includes a vertical axis 1151 representing the percentage of track pitch rms and a horizontal axis 1352 representing the frequency harmonics. Graph 1350 also includes a darker indicator 1354 and a lighter indicator 1353. Darker indicator 1354 shows the frequency amplitude of a conventional servo track writing process while lighter indicator 1353 shows the frequency amplitude of a servo track writing process in accordance with an embodiment of the present invention. Thus, in the embodiment shown, the present invention can substantially reduce harmonic amplitude present in high frequency written in RRO TMR.

Advantageously, embodiments of the present invention can reduce file level written in high frequency RRO and track mis-registration with out incurring increased design and manufacturing costs. Further advantageous is that embodiments of the present invention provide these reductions while maintaining analogous STW quality. Additionally advantageous is that the optimization method and system described herein and being applied to, for example an enterprise type hard disk drive, are readily adaptable for application with alternative types of hard disk drives as well as other products using a spindle motor. Further advantageous is that because embodiments of the present invention reduce RRO TMR, disk manufacturers can reduce the disk space allocation relative to RRO and TMR, thus increasing the net data storage capacity of a hard disk.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for reducing written-in high-frequency repeatable run-out track mis-registration occurring during writing of servo information onto a hard disk implementable in a hard disk drive, said system comprising:
    an excitation frequency adjuster enabled to adjust excitation frequencies away from mechanical modes to provide desired rotation speed of a servo track writer, said mechanical modes present in said hard disk drive;
    an excitation level adjuster enabled to adjust excitation level to provide a desired DC gain level associated with a motor controller of said servo track writer; and
    an excitation frequency content adjuster enabled to adjust excitation frequency content to provide desired current profile of said motor controller, wherein a reduction of written-in high-frequency repeatable run-out track mis-registration is realized.

2. The system as recited in claim 1 wherein said excitation frequency adjuster further comprises:
    a writing speed changer enabled to change writing speed of said servo track writer to achieve desired threshold values associated with flying height of servo track writer head relative to said hard disk upon which said servo information is to be disposed.

3. The system as recited in claim 2 wherein said writing speed changer is further enabled to change said writing speed to achieve desired threshold values related to timing rquirements of said servo track writer.

4. The system as recited in claim 1 wherein said excitation level adjuster further comprises:
    a repeatable run-out amplitude reducer enabled to reduce amplitude of said repeatable run-out, wherein said amplitude dependent upon DC gain level of said motor controller.

5. The system as recited in claim 1 wherein said excitation frequency content adjuster further comprises:
    a frequency content changer enabled to alter frequency content of said excitation frequency content.

6. The system as recited in claim 1 wherein said excitation frequency content adjuster further comprises:
    a commutation profile reshaper enabled to reshape commutation profile of said motor controller for substantially reducing high frequency noise.

7. The system as recited in claim 1 wherein said excitation frequency content adjuster further comprises:
    a commutation profile reshaper monitor enabled to monitor said commutation profile reshaper to ensure desired track quality.

8. A servo track writer enabled to reduce high-frequency repeatable run-out track mis-registration of a hard disk operable in a hard disk drive, said servo track writer comprising:
    a bus;
    a processor coupled to said bus;
    a memory unit coupled to said bus;
    a display device coupled to said bus;
    a hardware interface coupled to said bus and coupleable to said hard disk drive for providing communicative and electronic coupling of said hard disk drive to said servo track writer and for enabling rotation of said hard disk upon which servo track information is disposed;
    a controller for controlling said servo track writer and controlling rotation of said hard disk, said controller coupled to said bus;

a transducer for disposing said servo track information onto said hard disk and coupled to a transducer actuator, said transducer actuator coupled to said controller and for orientating a transducer above said hard disk;

an excitation frequency adjuster to adjust an excitation frequency away from mechanical modes to a desired rotating speed of a servo track writer, said excitation frequency adjuster coupled to said bus;

an excitation level adjuster to adjust excitation levels to a desired DC gain level associated with said controller of said servo track writer, said excitation level adjuster coupled to said bus; and an excitation frequency content adjuster to adjust excitation frequency content to provide desired current profile of said motor controller, said excitation frequency content adjuster coupled to said bus, wherein instances of said high frequency repeatable run-out track misregistration are reduced.

9. The servo track writer as recited in claim 8 wherein said excitation frequency adjuster further comprises:

a writing speed changer to alter writing speed of said servo track writer to achieve a desired threshold value associated with flying height of servo track writer head relative to said hard disk upon which said servo track information is to be disposed.

10. The servo track writer as recited in claim 8 wherein said excitation frequency adjuster further comprises:

a writing speed changer to alter writing speed of said servo track writer to achieve a desired threshold value related to timing requirements of said servo track writer.

11. The servo track writer as recited in claim 8 wherein said excitation level adjuster further comprises:

a repeatable run-out amplitude reducer to decrease amplitude of said repeatable run-out, said repeatable run out amplitude dependent upon DC gain level of said controller.

12. The servo track writer as recited in claim 8 wherein said excitation frequency content adjuster further comprises:

an excitation frequency content changer to reshape commutation profile of said motor current of said servo track writer, wherein a reshaped commutation profile substantially reduces high frequency noise.

13. The servo track writer as recited in claim 8 further comprising:

a reshaping monitor to monitor a reshaped commutation profile, said reshaping monitor to prevent increases in servo track writing timing and to reduce instances of decreased track quality, said monitor coupled to said bus.

* * * * *

UNITED STATES PATENT AND TRADEMARK OFFICE
CERTIFICATE OF CORRECTION

PATENT NO. : 7,345,842 B2  Page 1 of 1
APPLICATION NO. : 11/203486
DATED : March 18, 2008
INVENTOR(S) : Jr-Yi Shen et al.

It is certified that error appears in the above-identified patent and that said Letters Patent is hereby corrected as shown below:

Title page Item (56) insert:

JP-6-36434
JP-8-167278

Signed and Sealed this

Fifth Day of August, 2008

JON W. DUDAS
*Director of the United States Patent and Trademark Office*